(12) United States Patent
Alstad

(10) Patent No.: US 12,523,244 B2
(45) Date of Patent: Jan. 13, 2026

(54) LOCKING POSITIONING SYSTEMS

(71) Applicant: HONEYWELL INTERNATIONAL INC., Charlotte, NC (US)

(72) Inventor: Shawn Alstad, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 1031 days.

(21) Appl. No.: 17/452,687

(22) Filed: Oct. 28, 2021

(65) Prior Publication Data

US 2023/0138722 A1    May 4, 2023

(51) Int. Cl.
| F16B 5/02 | (2006.01) |
| B64D 27/40 | (2024.01) |
| F16C 35/063 | (2006.01) |

(52) U.S. Cl.
CPC ............ *F16B 5/0233* (2013.01); *B64D 27/40* (2024.01); *F16B 5/0225* (2013.01); *F16C 35/063* (2013.01)

(58) Field of Classification Search
CPC .. F16B 25/00; B62D 7/18; B60G 7/00; B60G 7/02; B60G 7/005; F16C 11/0623; F16C 11/0609; F16C 11/0604; F16C 11/0647; F16C 11/0695; F16C 11/0614
See application file for complete search history.

(56) References Cited

U.S. PATENT DOCUMENTS

| 2,043,272 | A | * | 6/1936 | Wallgren | ................ | F16C 35/02 |
| | | | | | | 411/266 |
| 5,662,012 | A | | 9/1997 | Grabovac | | |
| 8,231,144 | B2 | | 7/2012 | Alstad | | |
| 8,733,200 | B2 | * | 5/2014 | Retsch | ..................... | F16H 63/34 |
| | | | | | | 74/473.26 |
| 8,794,860 | B1 | * | 8/2014 | McGean | ............. | F16C 11/0642 |
| | | | | | | 403/137 |
| 10,247,035 | B2 | | 4/2019 | Lefebvre et al. | | |
| 11,072,438 | B2 | * | 7/2021 | Benthien | ................. | F16B 37/00 |
| 11,333,192 | B1 | * | 5/2022 | Lentner | ................ | F16C 11/069 |
| 2008/0019766 | A1 | * | 1/2008 | Flaim | .................. | F16C 11/0676 |
| | | | | | | 403/122 |
| 2015/0273966 | A1 | * | 10/2015 | Nilsson | ............... | F16C 11/0628 |
| | | | | | | 403/132 |
| 2016/0076401 | A1 | | 3/2016 | Besnard et al. | | |
| 2016/0215814 | A1 | * | 7/2016 | Cox | ....................... | F16C 11/068 |
| 2016/0229243 | A1 | * | 8/2016 | Wagner | ................... | F16C 33/74 |

(Continued)

FOREIGN PATENT DOCUMENTS

| CN | 205937347 U | 2/2017 |
| CN | 106704737 A | 5/2017 |

(Continued)

*Primary Examiner* — Daniel J Wiley
(74) *Attorney, Agent, or Firm* — Ingrassia Fisher & Lorenz, LLP

(57) ABSTRACT

A locking positioning system includes a bearing having an inner race and an outer race. The outer race is coupled to the inner race, and the outer race is to be coupled to a second structure. The locking positioning system includes a housing movably coupled to the inner race, and the housing is to be coupled to a first structure. The locking positioning system includes a lock ring coupled to the housing. The lock ring is movable between a first position, in which the inner race is held in a fixed position, and a second position, in which the inner race is movable to adjust a position of the second structure relative to the first structure.

18 Claims, 14 Drawing Sheets

(56) References Cited

U.S. PATENT DOCUMENTS

| | | | |
|---|---|---|---|
| 2017/0343023 A1* | 11/2017 | Schevers | F16B 5/025 |
| 2019/0133708 A1* | 5/2019 | Manley | F16C 11/0609 |
| 2019/0329907 A1* | 10/2019 | Benthien | B60N 2/01516 |
| 2020/0277068 A1 | 9/2020 | Tulloch et al. | |
| 2020/0307333 A1* | 10/2020 | Reddehase | B60G 7/02 |
| 2020/0309174 A1* | 10/2020 | McMahon | B64C 1/26 |
| 2022/0065389 A1* | 3/2022 | Grover | F16C 11/106 |
| 2023/0417273 A1* | 12/2023 | Gowda | F16C 11/0671 |

FOREIGN PATENT DOCUMENTS

| | | |
|---|---|---|
| DE | 9206149 U1 | 7/1992 |
| DE | 102018132192 A1 | 6/2020 |
| GB | 816873 A | 7/1959 |
| GB | 1010013 A | 11/1965 |

\* cited by examiner

LOCKING POSITIONING SYSTEMS

TECHNICAL FIELD

The present disclosure generally relates to systems for adjustably coupling two structures together, and more particularly relates to a locking positioning system that enables adjustment of one structure relative to the other structure over multiple degrees of freedom.

BACKGROUND

In certain instances, one or more structures may need to be mounted together, such as when mounting an engine to a vehicle, such as an aircraft, for example. In these instances, due to assembly constraints, manufacturing tolerances, and the like, the structures may not be properly aligned to enable fastening together using a conventional fastener. Rather, the structures may be slightly offset, such that the use of conventional fasteners is not feasible. Further, in certain instances, due to assembly constraints or manufacturing tolerances, one of the structures may need to be adjusted rotationally and linearly relative to the other structure at the installation site to enable the proper mounting of the structure to the other structure.

Accordingly, it is desirable to provide a locking positioning system for coupling structures together, which enables adjustment of one structure relative to the other structure in multiple degrees of freedom. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a locking positioning system. The locking positioning system includes a bearing including an inner race and an outer race. The outer race is coupled to the inner race, and the outer race is to be coupled to a second structure. The locking positioning system includes a housing movably coupled to the inner race, and the housing is to be coupled to a first structure. The locking positioning system includes a lock ring coupled to the housing. The lock ring is movable between a first position, in which the inner race is held in a fixed position, and a second position, in which the inner race is movable to adjust a position of the second structure relative to the first structure.

The locking positioning system includes a mechanical fastener that couples the lock ring to the inner race. The inner race defines an inner race attachment bore and the lock ring defines a lock ring bore coaxially aligned with the inner race attachment bore, and the mechanical fastener is received within the inner race attachment bore and the lock ring bore to couple the lock ring to the inner race. The lock ring bore is defined as a counterbore through a surface of the lock ring. The locking positioning system includes a spring disposed between a head of the mechanical fastener and a seat defined within the inner race attachment bore, and the spring biases the lock ring in the first position. The housing further includes a flange that includes a plurality of bores, with a head of the mechanical fastener received within one of the plurality of bores in the first position. The housing defines a plurality of housing teeth, and the lock ring defines a plurality of lock teeth that engage the plurality of housing teeth in the first position. The housing has a first housing end opposite a second housing end, with the plurality of housing teeth defined at the first housing end and a serrated slot defined at the second housing end, and the serrated slot is configured to receive a second mechanical fastener to couple the housing to the first structure. The second mechanical fastener includes a serrated washer, which engages with the serrated slot. The plurality of housing teeth are defined about a circumference of the housing and the plurality of lock teeth are defined about an inner circumference of the lock ring. The outer race defines at least one coupling bore to couple the outer race to the second structure. The outer race includes at least one threaded insert to receive a mechanical fastener to couple the outer race to the second structure. The lock ring includes a graspable surface defined about an outer perimeter of the lock ring. The first structure is a component associated with a vehicle, and the second structure is a component of an engine of the vehicle. The bearing is a spherical bearing.

Also provided is a locking positioning system. The locking positioning system includes a spherical bearing including an inner race and an outer race, and the outer race is coupled to the inner race. The outer race is to be coupled to a second structure. The locking positioning system includes a housing movably coupled to the inner race. The housing is to be coupled to a first structure and the housing defines a plurality of housing teeth about a circumference of the housing. The locking positioning system includes a lock ring coupled to the housing and the inner race. The lock ring defines a plurality of lock teeth about an inner circumference of the lock ring that engage the plurality of housing teeth in a first position. The lock ring movable between the first position, in which the inner race is held in a fixed position, and a second position, in which the inner race is movable to adjust a position of the second structure relative to the first structure.

The inner race defines an inner race attachment bore and the lock ring defines a lock ring bore coaxially aligned with the inner race attachment bore, and a mechanical fastener is received within the inner race attachment bore and the lock ring bore to couple the lock ring to the inner race. The locking positioning system includes a spring disposed between a head of the mechanical fastener and a seat defined within the inner race attachment bore, and the spring biases the lock ring in the first position. The housing defines a plurality of housing teeth about a circumference of the housing, and the lock ring defines a plurality of lock teeth about an inner circumference of the lock ring that engage the plurality of housing teeth in the first position. The housing has a first housing end opposite a second housing end, with the plurality of housing teeth defined at the first housing end and a serrated slot defined at the second housing end, and the serrated slot is configured to receive a second mechanical fastener to couple the housing to the first structure.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
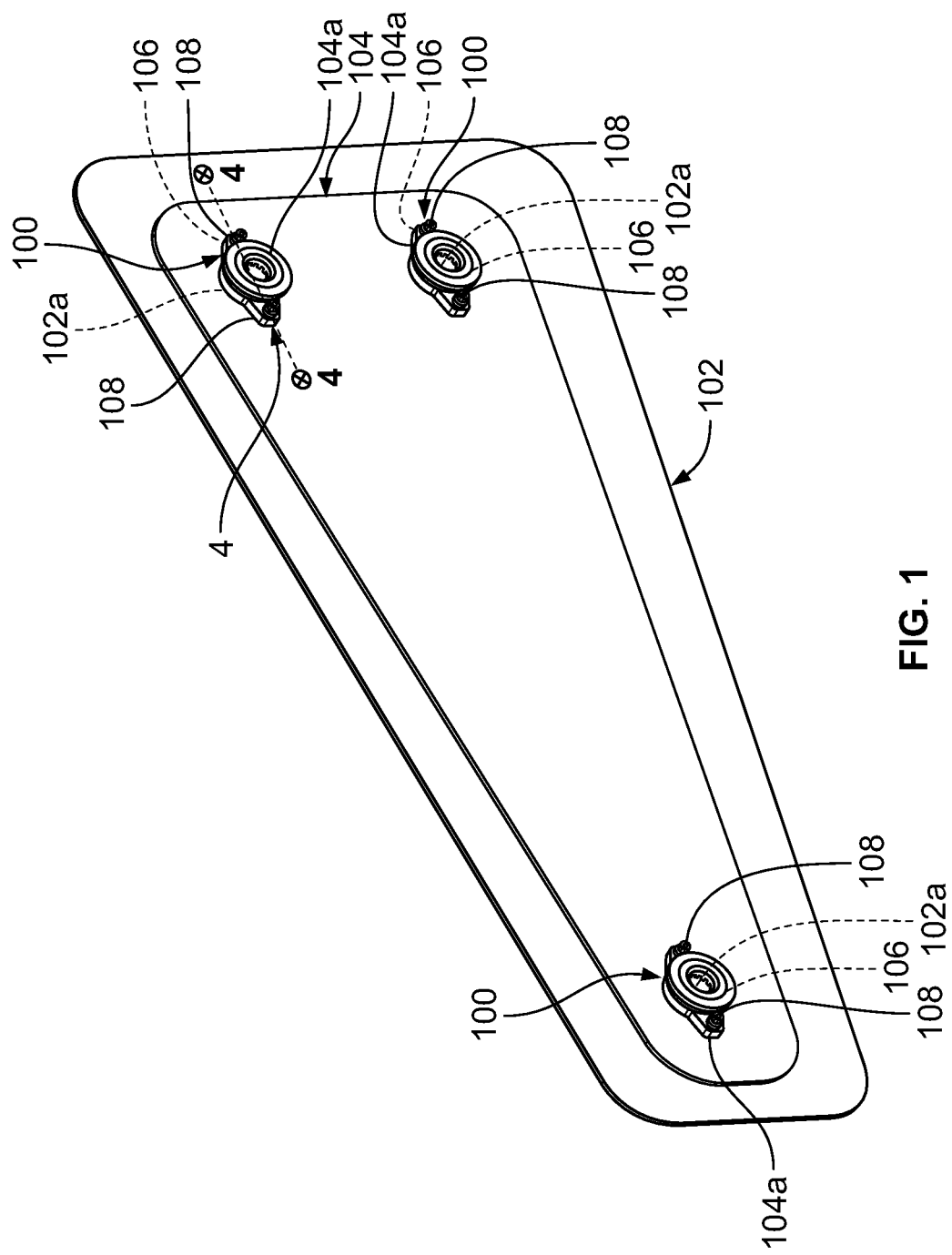
FIG. 1 is a schematic illustration of a plurality of exemplary locking positioning systems for coupling a movable structure, such as a component associated with a vehicle, to a fixed structure, such as the vehicle, in accordance with the various teachings of the present disclosure.

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of device that would benefit from a locking positioning system and the use of the locking positioning system for a gas turbine engine and a vehicle described herein is merely one exemplary embodiment according to the present disclosure. In addition, while the locking positioning system is described herein as being used with a gas turbine engine onboard a vehicle, such as a bus, motorcycle, train, automobile, marine vessel, aircraft, rotorcraft and the like, the various teachings of the present disclosure can be used with a gas turbine engine on a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

With reference to FIG. 1, a locking positioning system 100 is shown. In this example, three locking positioning systems 100 are shown for adjustably coupling a first, fixed structure 102 to a second, movable structure 104. In one example, the first, fixed structure 102 comprises a component associated with a vehicle, and the second, movable structure 104 is a component associated with an engine of the vehicle. In the example of the vehicle as an aircraft, the first, fixed structure is a pylon on an airframe of the aircraft. In the example the aircraft, the second, movable structure 104 is a portion of an engine, such as a transcowl associated with a gas turbine engine. For example, the first, fixed structure 102 comprises the inboard longeron 130 of the engine pylon 120 of commonly assigned U.S. application Ser. No. 17/452,690, now U.S. Pat. No. 12,024,305; and the second, movable structure 104 comprises the transcowl 112 of the gas turbine engine 102 of commonly assigned U.S. application Ser. No. 17/452,690, now U.S. Pat. No. 12,024,305, titled "Pylon System for Coupling Engine to Vehicle" to Alstad et al., the relevant portion of which is incorporated herein by reference. It should be noted that in FIG. 1, the first, fixed structure 102 and the second, movable structure 104 are simplified for clarity. The first, fixed structure 102 includes at least one or a plurality of attachment bores 102a, and the second, movable structure 104 includes at least one or a plurality of attachment points 104a. In this example, the first, fixed structure 102 includes three attachment bores 102a and the second, movable structure 104 includes three attachment points 104a. Each attachment point 104a includes a central receiving bore 106 and a pair of attachment holes 108 spaced apart from the central receiving bore 106 and opposite each other. The respective locking positioning system 100 is coupled to a respective one of the attachment bores 102a and a respective one of the attachment points 104a. As will be discussed, the locking positioning system 100 enables the movement or adjustment of the second, movable structure 104 relative to the first structure in multiple degrees of freedom enabling rotational and translational movement of the second, movable structure 104 relative to the first, fixed structure 102. Once the adjustment is complete, the locking positioning system 100 locks to fix the position and orientation of the second, movable structure 104 relative to the first, fixed structure 102.

Figure 2:
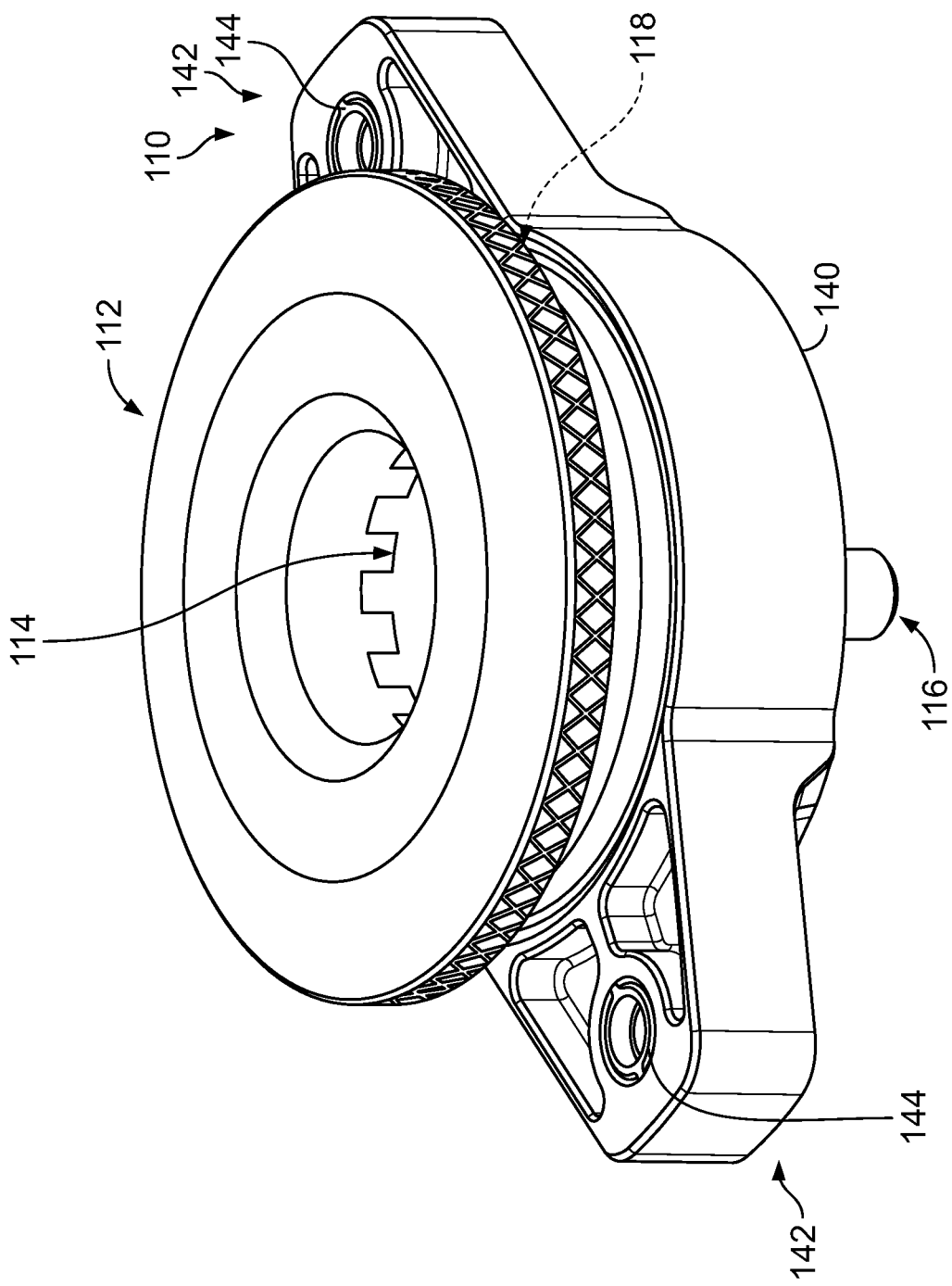
FIG. 2 is a top perspective view of one locking positioning system in a first, locked state in accordance with various embodiments.
Figure 3:
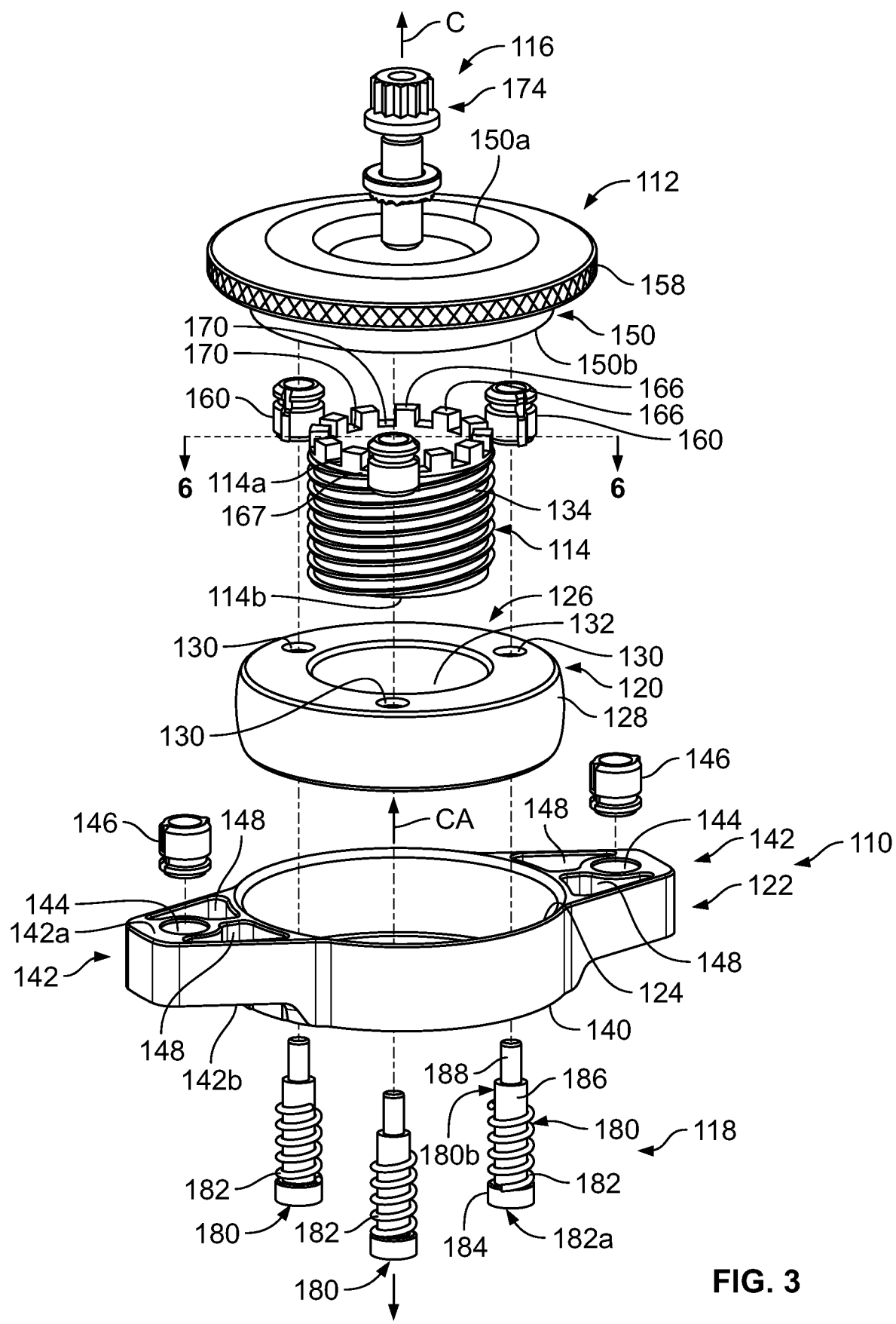
FIG. 3 is an exploded view of the locking positioning system of FIG. 2.

With reference to FIG. 2, a perspective view of the locking positioning system 100 is shown. In one example, the locking positioning system 100 includes a bearing, such as a spherical bearing 110, a lock ring 112, a housing 114, a mechanical fastener or attachment bolt 116, and at least one or a plurality of lock assemblies 118 (FIG. 3). As will be discussed, the locking positioning system 100 is movable between a first, locked state and a second, unlocked state to enable the second, movable structure 104 (FIG. 1) to be positioned in the desired orientation (rotation and translation) relative to the first, fixed structure 102 (FIG. 1).

With reference to FIG. 3, the spherical bearing 110 includes an inner race 120 and an outer race 122. The spherical bearing 110 is composed of metal or metal alloy, and is cast, machined, forged, stamped, additively manufactured, etc. The inner race 120 is coupled to an inner bore 124 of the outer race 122, and is movable relative to the outer race 122. Generally, the inner race 120 rotates angularly within the inner bore 124 of the outer race 122 relative to a central axis CA of the outer race 122, and also rotates about the central axis CA. The central axis CA of the outer race 122 is substantially parallel and colinear with a center axis C of the locking positioning system 100. The inner race 120 includes an inner race bore 126, an outer surface 128 and at least one or a plurality of inner race attachment bores 130. The inner race bore 126 is cylindrical and defines an inner perimeter or circumference of the inner race 120. The inner race bore 126 also defines a plurality of threads 132. The plurality of threads 132 cooperate with a plurality of threads 134 defined on the housing 114 to enable the inner race 120 to move relative to the housing 114. In this regard, a rotation of the inner race 120 causes a translation of the inner race 120 along the housing 114, and thus, the outer race 122 coupled to the inner race 120. The outer surface 128 defines the outer perimeter or circumference of the inner race 120. The outer surface 128 is substantially smooth, and arcuate to enable the angular movement of the inner race 120 relative to the outer race 122.

In this example, the inner race 120 defines three inner race attachment bores 130. It should be noted that in other examples, the inner race 120 may be configured differently. Each of the inner race attachment bores 130 is cylindrical, and substantially smooth. In one example, with reference to FIG. 4, each of the inner race attachment bores 130 includes a reduced diameter proximate a first side 120a of the inner race 120. The first side 120a of the inner race 120 is opposite a second side 120b. The reduced diameter of each of the inner race attachment bores 130 defines a respective seat 136. As will be discussed, the seat 136 cooperates with a respective one of the lock assemblies 118 to limit a movement of the respective one of the lock assemblies 118.

Figure 4:
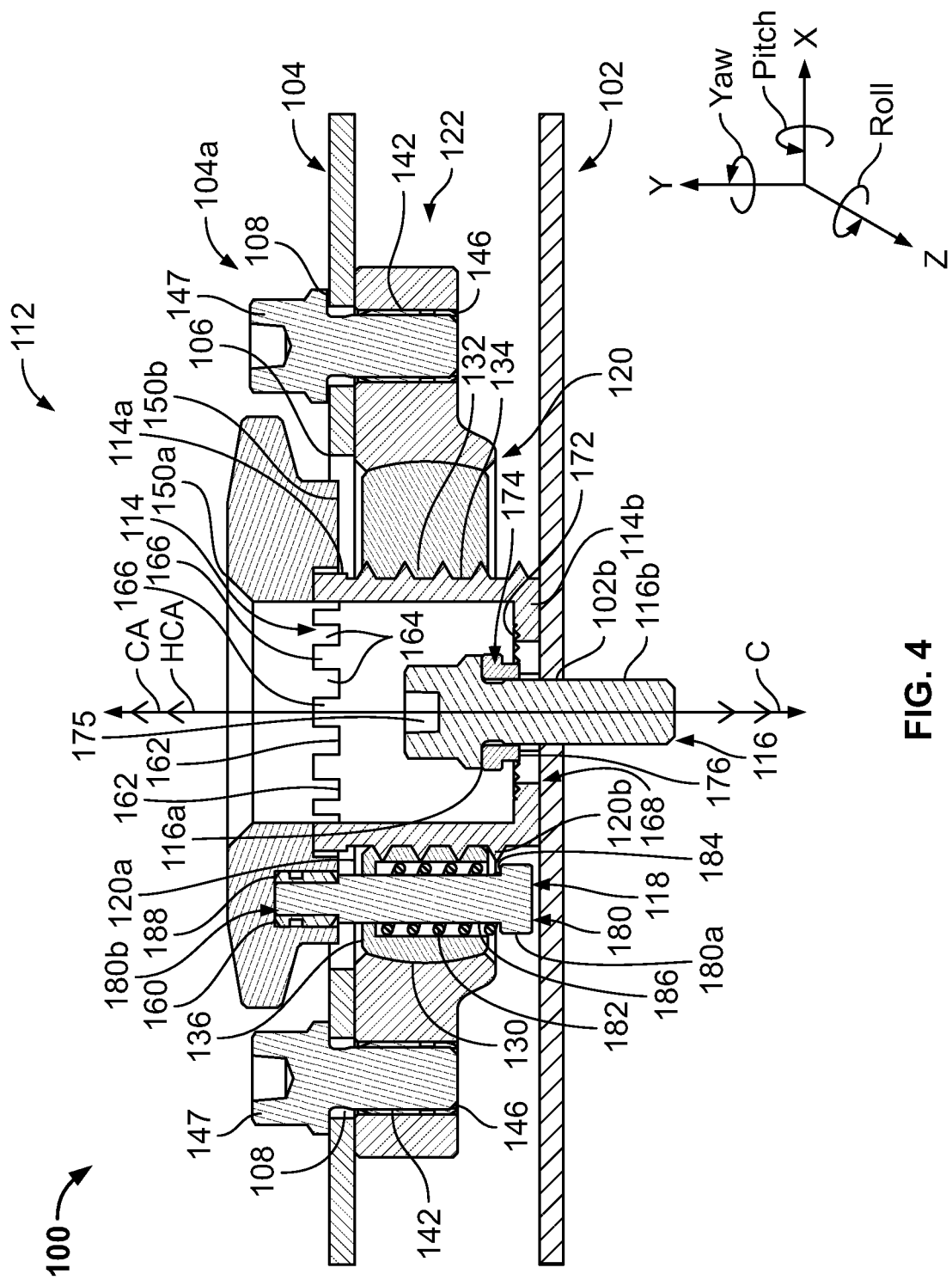
FIG. 4 is a cross-sectional view of the locking positioning system, taken along line 4-4 of FIG. 1, in which a lock ring associated with the locking positioning system is in a first position and the locking positioning system is in the first, locked state.

With reference back to FIG. 3, the outer race 122 surrounds the inner race 120. The outer race 122 includes the inner bore 124, an outer race surface 140 and at least one or a pair of coupling flanges 142. The inner bore 124 receives the inner race 120, and defines the inner perimeter or spherical diameter of the outer race 122. The inner bore 124 has a smooth, arcuate surface, which cooperates with the spherical diameter or outer surface 128 of the inner race 120 to enable the inner race 120 to move and articulate relative to the outer race 122. The outer race 122 remains coupled to the inner race 120 due to the contact between the inner bore 124 of the inner race 120 and the outer surface 128 of the outer race 122. The outer race surface 140 defines an outer perimeter or surface of the outer race 122. The pair of coupling flanges 142 are coupled to the outer race surface 140 so as to extend axially from the outer race surface 140 on opposed sides of the outer race surface 140. Each of the coupling flanges 142 define a coupling bore 144. The coupling bore 144 is defined to extend along an axis substantially parallel to the central axis CA of the outer race 122. In this example, the coupling bore 144 includes a threaded insert 146, however, in other embodiments, the coupling bore 144 may include a plurality of internal threads. The threaded insert 146 includes a plurality of internal threads. The threaded insert 146 receives a mechanical fastener, such as a bolt 147 (FIG. 4), to couple the outer race 122 to the second, movable structure 104 (FIG. 4). In one example, the threaded insert 146 also includes a plurality of external threads and defines a groove about an outer circumference of the threaded insert 146. The threaded insert 146 is threadably coupled to the coupling bore 144, and stakes are driven through the coupling flange 142 and the coupling bore 144 to contact the groove of the threaded insert 146 to couple the threaded insert 146 to the coupling bore 144. In other examples, the threaded insert 146 may be press-fit into the coupling bore 144, or secured through another technique. Each of the coupling flanges 142 may define a plurality of reliefs 148 for mass savings. The reliefs 148 may be formed on both a first side 142a and an opposite second side 142b of each of the coupling flanges 142. Generally, the reliefs 148 do not extend through the coupling flange 142 from the first side 142a to the second side 142b. The reliefs 148 are generally defined such that an outer perimeter of the coupling flange 142 is solid, along with a solid branch interconnecting a central portion of the coupling flange 142 with the outer race surface 140.

The lock ring 112 is coupled to the housing 114. As will be discussed, the lock ring 112 is movable between a first position, in which the inner race 120 and the outer race 122 are held in a fixed position and the locking positioning system 100 is the first, locked state; and a second position, in which the inner race 120 is movable to adjust a position of the second, movable structure 104 relative to the first, fixed structure 102 and the locking positioning system 100 is in the second, unlocked state. The lock ring 112 is composed of metal or metal alloy, and is cast, machined, forged, stamped, additively manufactured, etc. The lock ring 112 includes a lock ring body 150, a lock ring flange 152, lock ring bores 154 and an inner lock ring bore 156.

Figure 5:
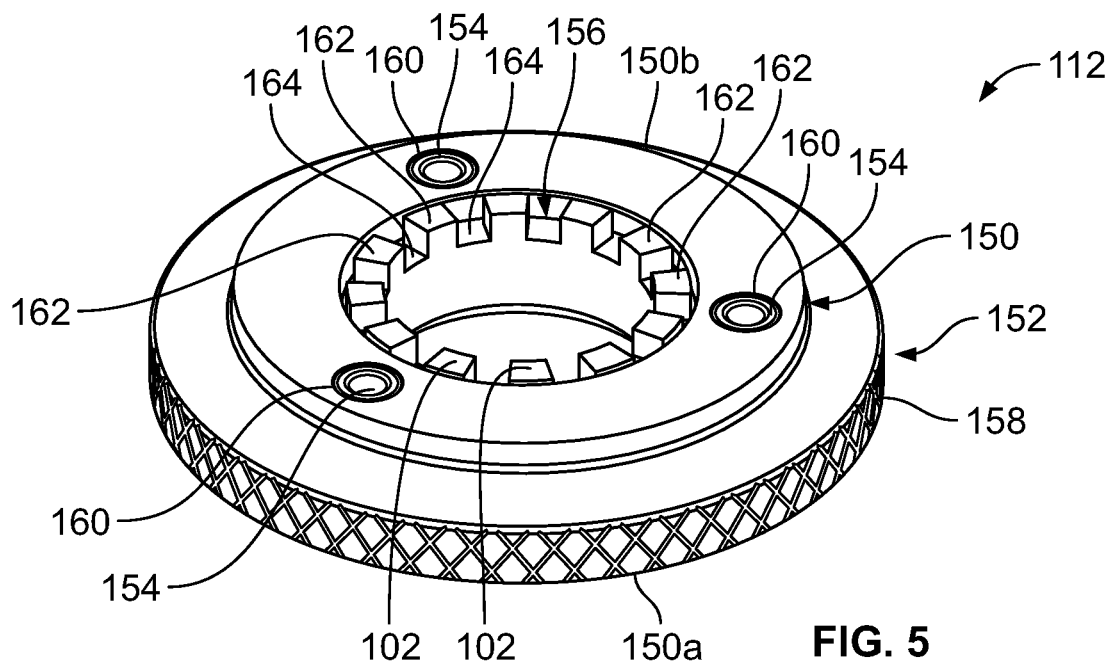
FIG. 5 is a top perspective view of the lock ring associated with the locking positioning system.

The lock ring body 150 is cylindrical, and extends from a first ring end 150a to an opposite second ring end 150b. The lock ring flange 152 is defined about an outer perimeter or circumference of the lock ring 112 at the first ring end 150a and extends axially from the first ring end 150a toward the second ring end 150b. The lock ring flange 152 extends axially outward to define a graspable surface 158 to enable a user to manipulate the lock ring 112. In one example, the graspable surface 158 is textured, and includes knurling, but the graspable surface 158 may be smooth, dimpled, etc. With reference to FIG. 5, the lock ring bores 154 are defined through the lock ring body 150 at the second ring end 150b. In this example, the lock ring 112 includes three lock ring bores 154, however, the lock ring 112 may include any number of bores that comports with the number of lock assemblies 118. With reference to FIG. 4, the lock ring bores 154 are defined as counterbores through the second ring end 150b such that the lock ring bores 154 do not extend through the lock ring 112 from the first ring end 150a to the second ring end 150b. Generally, the lock ring bores 154 terminate within the lock ring 112 within a region of the lock ring body 150 surrounded by the lock ring flange 152. In this example, each of the lock ring bores 154 include a respective locking insert 160. The locking inserts 160 are internally threaded, and threadably engage with a plurality of threads defined on a mechanical fastener, such as a shoulder bolt 180 of a respective one of the lock assemblies 118. In one example, the locking insert 160 also includes a plurality of external threads and defines a groove about an outer circumference of the locking insert 160. The locking inserts 160 is threadably coupled to the lock ring bore 154, and stakes are driven through the lock ring 112 and the lock ring bore 154 to contact the groove to couple the locking insert 160 to the lock ring bore 154. In other examples, the locking insert 160 may be press-fit into the lock ring bore 154, or secured through another technique. Each of the lock ring bores 154 is coaxially aligned with a respective one of the inner race attachment bores 130 to receive the shoulder bolt 180 of the respective one of the lock assemblies 118 (FIG. 4).

Figure 8:
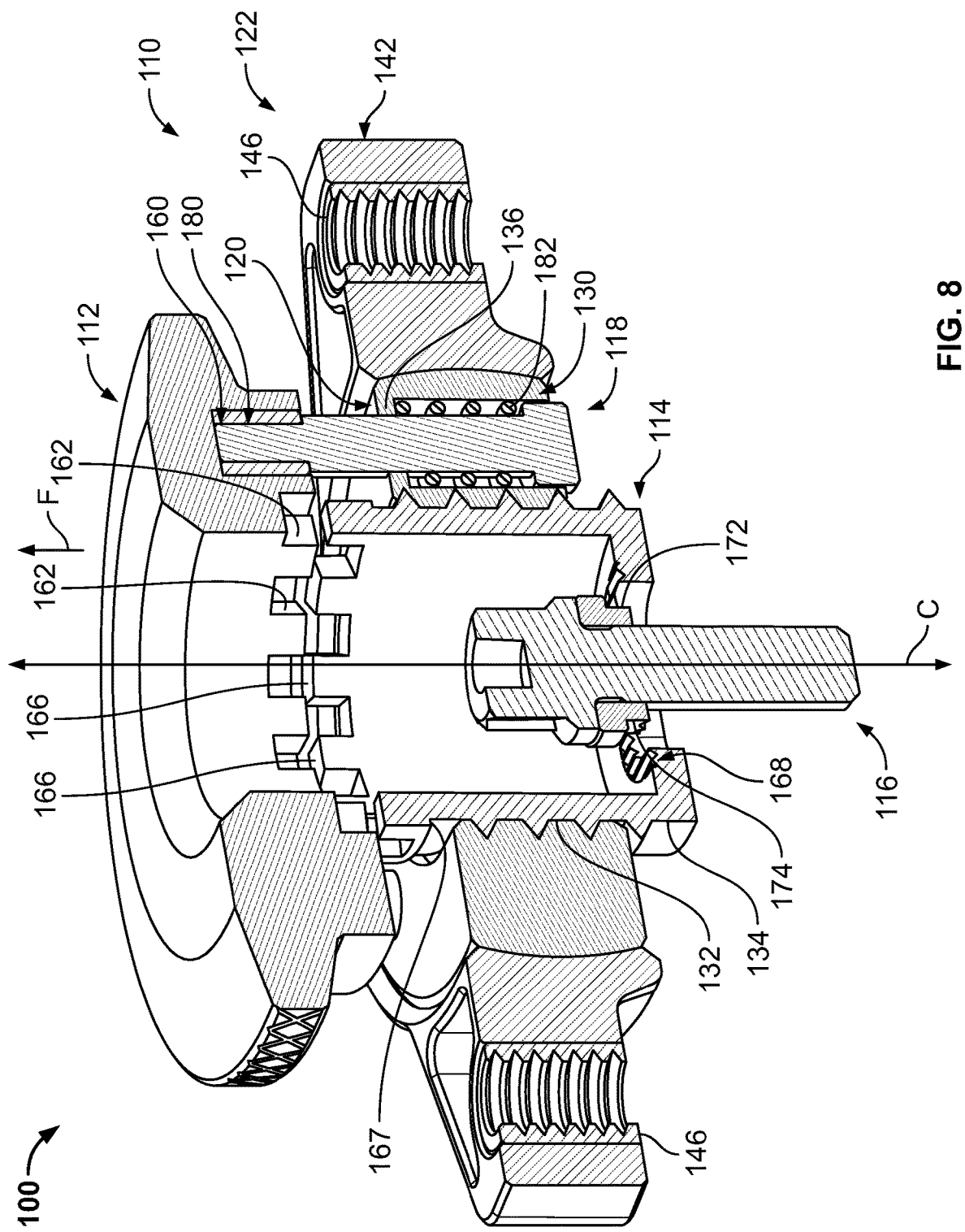
FIG. 8 is a cross-sectional view of the locking positioning system, taken from the perspective of line 4-4 of FIG. 1, in which the lock ring associated with the locking positioning system is in a second position and the locking positioning system is in a second, unlocked state.

The inner lock ring bore 156 extends from the first ring end 150a to the second ring end 150b. In one example, the inner lock ring bore 156 is defined as a countersunk hole through the lock ring 112. With reference to FIG. 5, the inner lock ring bore 156 includes a plurality of lock teeth 162 defined about an inner perimeter or circumference of the inner lock ring bore 156 at the second ring end 150b. A tooth space 164 is defined between adjacent lock teeth 162, and the tooth space 164 receives a respective tooth of a plurality of housing teeth 166 (FIG. 4) of the housing 114 (FIG. 4) when the lock ring 112 is in the first position and the locking positioning system 100 is in the first, locked state (FIG. 4). Each of the housing teeth 166 is spaced apart from the respective tooth space 164 and the lock teeth 162 when the lock ring 112 is in the second position and the locking positioning system 100 is in the second, unlocked state (FIG. 8).

The housing 114 defines the housing teeth 166 at a first housing end 114a and defines a slot 168 at a second housing end 114b, with the second housing end 114b opposite the first housing end 114a. The housing 114 is composed of metal or metal alloy, and is cast, machined, forged, stamped, additively manufactured, etc. With reference to FIG. 3, the housing 114 is cylindrical, with an open perimeter at the first housing end 114a and a closed perimeter at the second housing end 114b. The housing 114 includes the plurality of threads 134 that extend from the first housing end 114a to the second housing end 114b, and cooperate with the threads 132 of the inner race 120 to enable the inner race 120 to move relative to the housing 114 in the second position of the lock ring 112. The housing teeth 166 extend axially from the first housing end 114a to engage with the lock ring 112, as discussed. The housing teeth 166 also define a stop 167 at the first housing end 114a. In this regard, the housing teeth 166 are defined to extend radially outward from the outer circumference of the housing 114, which forms a shelf or annular ledge defining the stop 167 that limits the further advancement of the inner race 120 relative to the housing 114. Stated another way, the stop 167 retains the inner race 120 on the housing 114. A housing tooth space 170 defined between adjacent housing teeth 166 receives a respective one of the lock teeth 162 when the lock ring 112 is in the first position and the locking positioning system 100 is in the first, locked state (FIG. 4). Each of the lock teeth 162 is spaced apart from the respective housing tooth space 170 and the housing teeth 166 when the lock ring 112 is in the second position and the locking positioning system 100 is in the second, unlocked state (FIG. 8).

Figure 6:
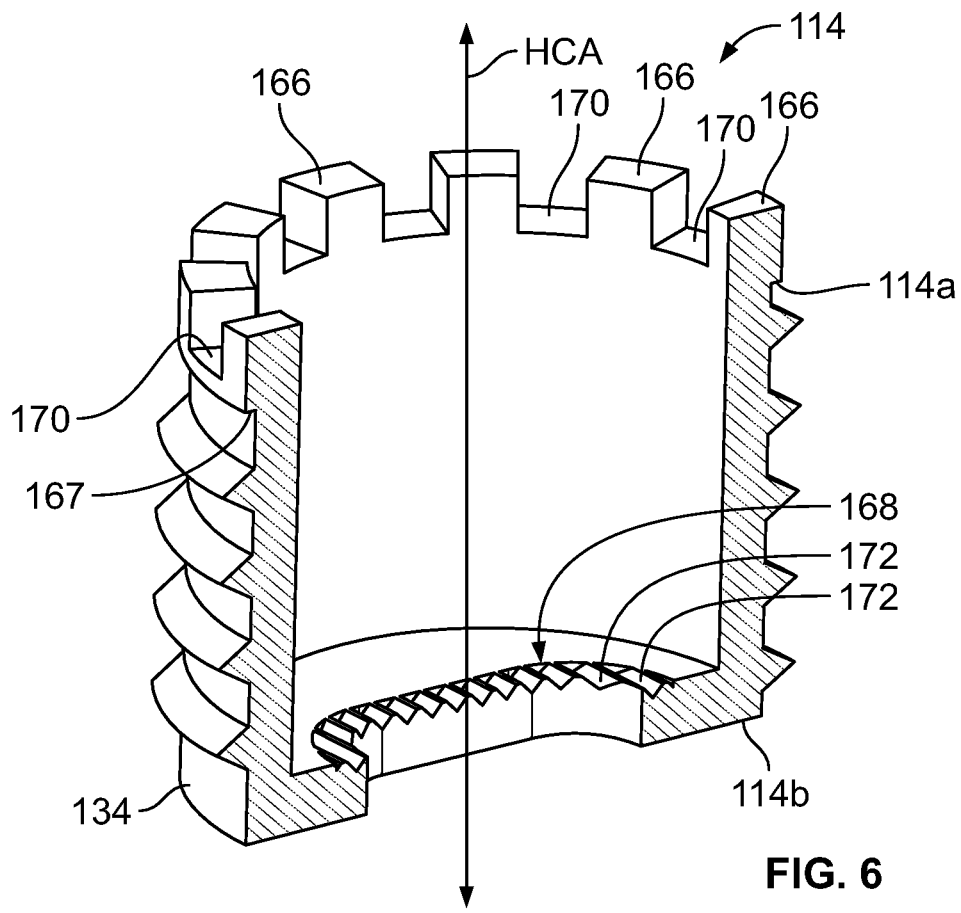
FIG. 6 is a cross-sectional view of a housing associated with the locking positioning system, taken along like 4-4 of FIG. 1, with the remaining components of the locking positioning system removed for clarity.

With reference to FIG. 6, an interior surface of the housing 114 is substantially smooth. At the second housing end 114b, the slot 168 is defined to enable the attachment bolt 116 to pass through the housing 114 and into the first, fixed structure 102 (FIG. 4). In this example, the slot 168 is elongated, and is defined along an axis that is substantially parallel to a housing central axis HCA. The housing central axis HCA is substantially parallel and colinear with the central axis CA of the outer race 122 and the center axis C of the locking positioning system 100 (FIG. 4). In this example, the slot 168 includes a plurality of slot serrations 172. The slot serrations 172 are defined about a perimeter of the slot 168, and cooperate with a serrated washer 174 (FIG. 4) of the attachment bolt 116 to couple the attachment bolt 116 (FIG. 4) to the housing 114. Generally, the slot serrations 172 enable the attachment bolt 116 to be coupled at various locations along the slot 168, which enables the translation of the second, movable structure 104 (FIG. 4) relative to the first, fixed structure 102. It should be noted that the number of slot serrations 172 and the spacing between adjacent slot serrations 172 is predetermined to enable finite locations for coupling the attachment bolt 116 to the slot 168.

With reference to FIG. 4, the attachment bolt 116 is coupled to the housing 114 via the serrated washer 174. The attachment bolt 116 and the serrated washer 174 are each composed of metal or metal alloy, and are cast, machined, forged, additively manufactured, etc. The serrated washer 174 includes a plurality of washer serrations 176 that engage with the slot serrations 172 to maintain the position of the attachment bolt 116 relative to the housing 114. The serrated washer 174 is coupled about a head 116a of the attachment bolt 116. The head 116a of the attachment bolt 116 includes a tool coupling feature 175, such as a hexagonal outer surface, internal hexagonal socket, etc. for coupling the attachment bolt 116 to a tool, such as a torque wrench, hex key, etc. A shank 116b of the attachment bolt 116 is coupled to the first, fixed structure 102. In one example, the shank 116b includes threads and the attachment bore 102a is threaded to enable the attachment bolt 116 to be threadably coupled to the first, fixed structure 102. Alternatively, or in addition, a nut (not shown) may be coupled to the shank 116b to further couple the attachment bolt 116 to the first, fixed structure 102. While the attachment bolt 116 is described and illustrated herein as a bolt, it should be noted that any suitable mechanical fastener may be employed to removably couple the housing 114, and thus, the locking positioning system 100 to the first, fixed structure 102.

Figure 7:
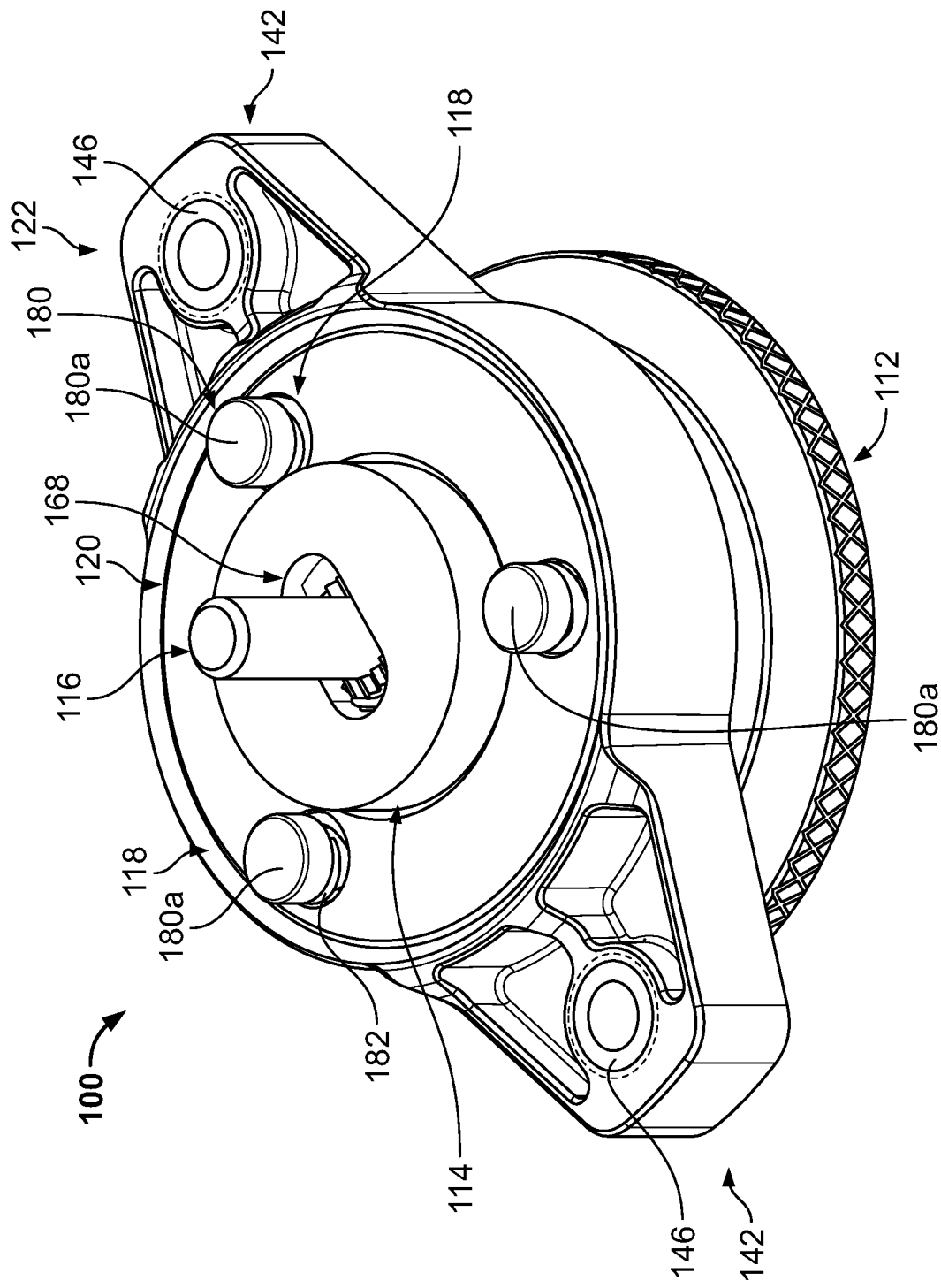
FIG. 7 is a bottom perspective view of the locking positioning system of FIG. 2 in the first, locked state.

With reference to FIG. 3, in this example, the locking positioning system 100 includes three lock assemblies 118. Each of the lock assemblies 118 includes a shoulder bolt 180 and a biasing member or spring 182. The shoulder bolt 180 is composed of metal or metal alloy, and is cast, machined, forged, additively manufactured, etc. The spring 182 is composed of spring steel, and is extruded and wound. With reference to FIG. 4, the shoulder bolt 180 includes a head 180*a* and a shank 180*b*. The head 180*a* is cylindrical, and has a diameter greater than the shank 180*b* to provide a second seat 184 for the spring 182. The shank 180*b* is a stepped shank, and includes a smooth portion 186 that extends from the head 180*a* to a threaded portion 188. The threaded portion 188 has a diameter that is different and smaller than the smooth portion 186. The threaded portion 188 includes a plurality of threads to engage with the internal threads of a respective one of the locking inserts 160. Generally, with reference to FIG. 7, when the threaded portion 188 is engaged with and coupled to the locking inserts 160, the head 180*a* of the shoulder bolt 180 extends beyond the second side 120*b* of the inner race 120. By sizing the shank 180*b* such that the head 180*a* is external to the inner race 120, additional travel of the shoulder bolt 180 is provided to ensure that the lock teeth 162 disengage with the housing teeth 166 in the second position of the lock ring 112. With reference back to FIG. 4, the spring 182 is coupled about the shoulder bolt 180 and one end of the spring 182 is seated on the second seat 184 of the head 180*a*. The shoulder bolt 180 is inserted through a respective one of the inner race attachment bores 130 such that the spring 182 is received about the smooth portion 186 and retained within the respective inner race attachment bore 130 between the seat 136 and the second seat 184. Generally, as will be discussed, the spring 182 is compressible by the head 180*a* of the shoulder bolt 180 to enable the lock ring 112 to be spaced apart from the housing 114 in the second position (FIG. 8). In one example, the springs 182 compress to enable the lock ring 112 to move about 0.25 inches, which is about equal to or greater than a height of the housing teeth 166. In one example, the user applies a force F of about 5 pounds (lbs.) to about 15 pounds (lbs.) to move the lock ring 112 away from the housing 114. Once a force is removed from the lock ring 112, the springs 182 expand, and engage the lock teeth 162 with the housing teeth 166 to return the lock ring 112 to the first position. In one example, each of the springs 182 have a spring rate of about 7 to about 20 pounds per inch (lbs./in). Generally, the locking positioning system 100 has a spring rate of about 20 pounds per inch (lbs./in.) to about 60 pounds per inch (lbs./in.), and while in this example, the spring rate is divided over three springs 182, any number of springs may be employed.

In order to assemble the locking positioning system 100, in one example, with the outer race 122 and the inner race 120 formed, the inner race 120 is coupled to the outer race 122 so as to be movable relative to the outer race 122. The threaded inserts 146 are coupled to the coupling flanges 142 of the outer race 122. With the housing 114 formed, the threads 134 of the housing 114 are engaged with the threads 132 of the inner race 120. With the springs 182 positioned about the shoulder bolts 180, the shoulder bolts 180 are inserted into the inner race attachment bores 130. With the lock ring 112 formed, the locking inserts 160 are coupled to the lock ring 112. The shoulder bolts 180 are engaged with the locking inserts 160 and the lock teeth 162 are engaged with the housing teeth 166. With the lock teeth 162 engaged with the housing teeth 166, the lock ring 112 is in the first position and the locking positioning system 100 is in the first, locked state. In the first position and first, locked state, the inner race 120 and the outer race 122 are held in a fixed position, and thus, the position of the second, movable structure 104 relative to the first, fixed structure 102 is fixed and inhibited from movement during operation of the vehicle, for example, during flight of the aircraft.

In the first, locked state, the locking positioning system 100 is coupled to the second, movable structure 104. The bolts 147 are inserted through the attachment holes 108 and into the threaded inserts 146 to couple the locking positioning system 100 to the second, movable structure 104. With the serrated washer 174 coupled about the head 116*a* of the attachment bolt 116, the attachment bolt 116 is inserted through the slot 168 and translated along the slot serrations 172 of the slot 168 until the second, movable structure 104 is located at a lateral position relative to the first, fixed structure 102.

In order to adjust a rotational or angular position of the second, movable structure 104 relative to the first, fixed structure, the lock ring 112 is moved from the first position to the second position. With reference to FIG. 8, the lock ring 112 is shown in the second position, and the locking positioning system 100 is in the second, unlocked state. In the second position and the second, unlocked state, the inner race 120 is movable relative to the housing 114 to adjust a position of the second, movable structure 104 relative to the first, fixed structure 102. In order to move the lock ring 112 to the second position, the force F is applied along the center axis C of the locking positioning system 100 to move the lock ring 112 relative to the housing 114. In one example, the force F is applied by a user gripping the lock ring 112 and pulling the lock ring 112 away from the housing 114. As the lock ring 112 moves along the center axis C, the shoulder bolts 180 translate within the inner race attachment bores 130 and compress the springs 182. Once the lock ring 112 is moved such that the lock teeth 162 are spaced apart from the housing teeth 166, the inner race 120 is rotatable by the movement of the lock ring 112. In this regard, as the lock ring 112 is coupled to the inner race 120 via the lock assemblies 118, a movement of the lock ring 112 results in a corresponding movement of the inner race 120. In the second position, the lock ring 112 is manipulatable to move the second, movable structure 104 (FIG. 4) angularly relative to the first, fixed structure 102 (FIG. 4). The lock ring 112 is also rotatable in the second position, which enables the inner race 120 to be translated relative to the housing 114 along the center axis C, with the movement of the inner race 120 limited by the stop 167 of the housing 114. The movement of the inner race 120 along the center axis C enables the second, movable structure 104 to be spaced closer to or further apart from the first, fixed structure 102 as the inner race 120 is coupled to the outer race 122 and the outer race 122 translates with the inner race 120. Once the adjustment of the second, movable structure 104 relative to the first, fixed structure 102 is complete, the lock ring 112 is released by the user, and the springs 182 expand, pulling the lock ring 112, and thus, the lock teeth 162 into engagement with the housing teeth 166. The springs 182 bias the lock ring 112 in the first position and bias the locking positioning system 100 in the first, locked state.

Thus, with reference to FIG. 4, the locking positioning system 100 enables adjustment of the second, movable structure 104 in multiple degrees of freedom. In this regard, the attachment bolt 116 cooperates with the slot 168 of the housing 114 to enable adjustment of the second, movable structure along an X-axis. The threads 132 of the inner race 120 cooperates with the threads 134 of the housing 114 to enable adjustment of the second, movable structure along a Y-axis, which is parallel to the center axis C. The angular rotation of the inner race 120 relative to the outer race 122 enables adjustment of the second, movable structure 104 in a yaw direction, rotating about the Y-axis. The rotation of the inner race 120 relative to the outer race 122 also enables adjustment of the second, movable structure 104 in a roll direction, rotating about the Z-axis. The rotation of the inner race 120 relative to the outer race 122 enables adjustment of the second, movable structure 104 in a pitch direction, rotating about the X-axis.

Figure 9:
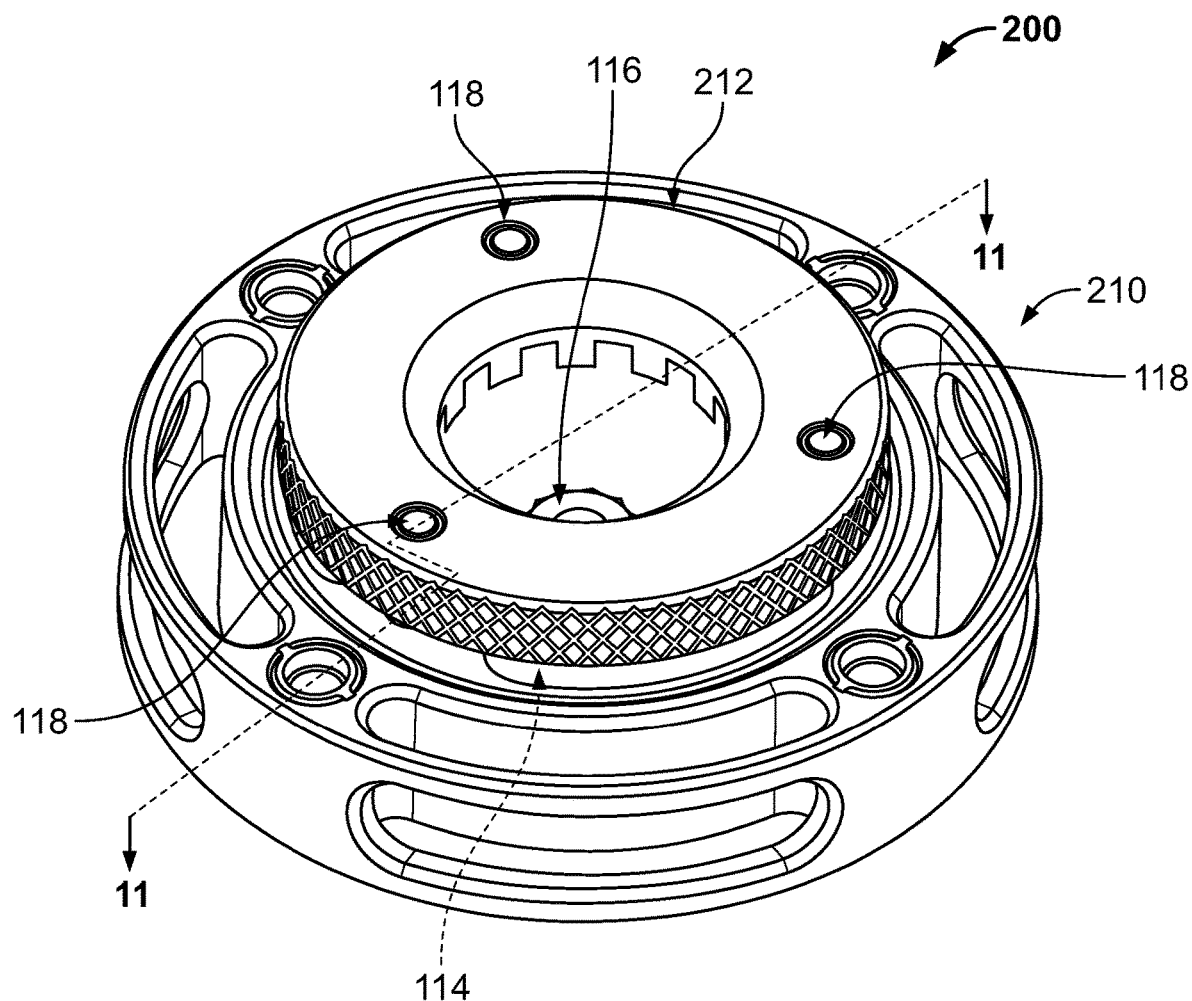
FIG. 9 is a top perspective view of another exemplary locking positioning system for coupling a movable structure, such as a component associated with a vehicle, to a fixed structure, such as the vehicle, in a first, locked state in accordance with the various teachings of the present disclosure.
Figure 10:
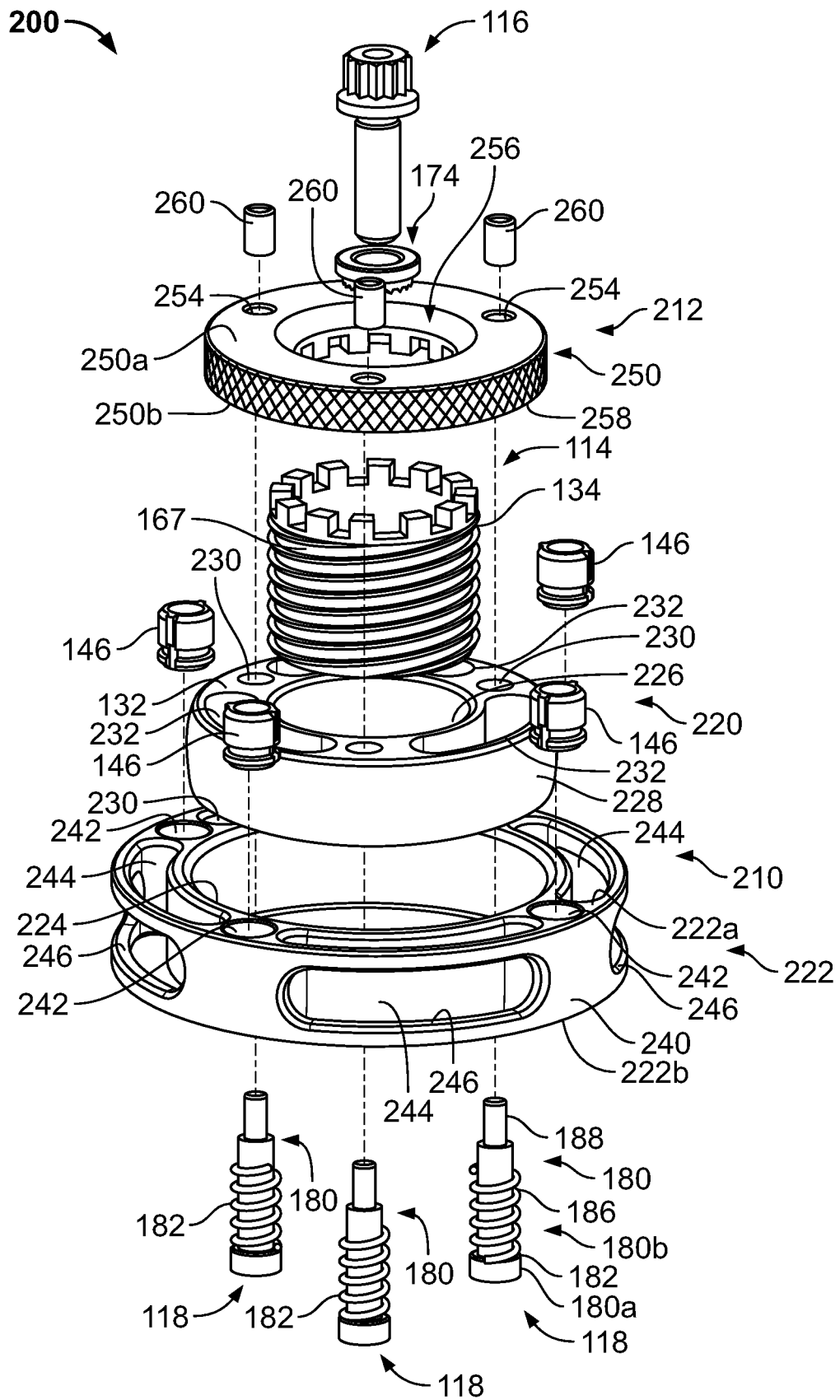
FIG. 10 is an exploded view of the locking positioning system of FIG. 9.

It should be noted that in other embodiments, the locking positioning system 100 may be configured differently to enable movement of the second, movable structure 104 relative to the first, fixed structure 102 in various degrees of freedom. For example, with reference to FIG. 9, a locking positioning system 200 is shown. As the locking positioning system 200 includes components that are the same or similar to components of the locking positioning system 100 discussed with regard to FIGS. 1-8, the same reference numerals will be used to denote the same or similar components. In this example, the locking positioning system 200 includes a bearing, such as a spherical bearing 210, a lock ring 212, the housing 114 (FIG. 10), the attachment bolt 116, and the plurality of lock assemblies 118 (FIG. 10). The locking positioning system 200 is movable between the first, locked state and the second, unlocked state to enable the second, movable structure 104 (FIG. 1) to be positioned in the desired orientation (rotation and translation) relative to the first, fixed structure 102 (FIG. 1).

With reference to FIG. 10, the spherical bearing 210 includes an inner race 220 and an outer race 222. The spherical bearing 210 is composed of metal or metal alloy, and is cast, machined, forged, stamped, additively manufactured, etc. The inner race 220 is coupled to an inner bore 224 of the outer race 222, and is movable relative to the outer race 222. Generally, with reference to FIG. 11, the inner race 220 rotates angularly within the inner bore 224 of the outer race 222 relative to a central axis CA1 of the outer race 222, and also rotates about the central axis CAL The central axis CA1 of the outer race 222 is substantially parallel and colinear with a center axis C1 of the locking positioning system 200. With reference back to FIG. 10, the inner race 220 includes an inner race bore 226, an outer surface 228, at least one or a plurality of inner race attachment bores 230 and at least one or a plurality of inner race slots 232. The inner race bore 226 is cylindrical and defines an inner perimeter or circumference of the inner race 220. The inner race bore 226 also defines the plurality of threads 132. The plurality of threads 132 cooperate with the plurality of threads 134 defined on the housing 114 to enable the inner race 220, and thus, the outer race 222 coupled to the inner race 220, to translate relative to the housing 114. The outer surface 228 defines the outer perimeter or circumference of the inner race 220. The outer surface 228 is substantially smooth, and arcuate to enable the angular movement of the inner race 220 relative to the outer race 222.

In this example, the inner race 220 defines three inner race attachment bores 230. It should be noted that in other examples, the inner race 220 may be configured differently. Each of the inner race attachment bores 230 is cylindrical, and substantially smooth. In one example, with reference to FIG. 11, each of the inner race attachment bores 230 includes a reduced diameter proximate a first side 220a of the inner race 220. The first side 220a of the inner race 220 is opposite a second side 220b. The reduced diameter of each of the inner race attachment bores 230 defines the respective seat 136.

With reference back to FIG. 10, the inner race slots 232 are defined between the inner race attachment bores 230 and alternate with the inner race attachment bores 230. In this example, the inner race 220 includes three inner race slots 232 that each alternate with the inner race attachment bores 230 about the circumference of the inner race 220. The inner race slots 232 are arcuate, and reduce a mass of the inner race 220. The inner race slots 232 extend from the first side 220a to the second side 220b, however, in other embodiments, the inner race slots 232 may not extend through the entirety of the inner race 220.

The outer race 222 surrounds the inner race 220. The outer race 222 includes the inner bore 224, an outer race surface 240, a plurality of coupling bores 242 and at least one or a plurality of outer race slots 244. The inner bore 224 receives the inner race 220, and defines the inner perimeter or circumference of the outer race 222. The inner bore 224 has a smooth, arcuate surface, which cooperates with the outer surface 228 of the inner race 220 to enable the inner race 220 to move and articulate relative to the outer race 222. The outer race surface 240 defines an outer perimeter or surface of the outer race 222. In this example, the outer race surface 240 is discontinuous, or is interrupted by slots 246. The slots 246 are defined through the outer race surface 240 and are in communication with the outer race slots 244. In this example, the slots 246 are defined so as to be positioned between adjacent ones of the coupling bores 242. The slots 246 provide a mass savings for the outer race 222.

The coupling bores 242 are each defined to extend along an axis substantially parallel to the central axis CA of the outer race 222. In this example, each of the coupling bores 242 includes the threaded insert 146, however, in other embodiments, the coupling bores 242 may include a plurality of internal threads. The threaded insert 146 includes the plurality of internal threads to receive the mechanical fastener, such as the bolt, to couple the outer race 222 to the second, movable structure 104 (FIG. 1). The threaded insert 146 may be press-fit into the respective coupling bore 242, for example. In this example, the outer race 222 has four coupling bores 242, but the outer race 222 may have any desired number of coupling bores 242.

The outer race slots 244 are defined through the outer race 222 from a first race end 222a to an opposite second race end 222b. In this example, the outer race 222 includes four outer race slots 244, which are spaced apart about the circumference of the outer race 222. In this example, the outer race slots 244 alternate with the coupling bores 242 about the circumference of the outer race 222. The outer race slots 244 provide a mass savings for the outer race 222. In this example, the outer race slots 244 are in communication with the slots 246.

The lock ring 212 is coupled to the housing 114. The lock ring 212 is movable between the first position, in which the inner race 220 and the outer race 222 are held in a fixed position and the locking positioning system 200 is in first, locked state; and a second position, in which the inner race 220 is movable relative to the housing 114 to adjust a position of the second, movable structure 104 relative to the first, fixed structure 102 (FIG. 1) and the locking positioning system 200 is in the second, unlocked state. The lock ring 212 is composed of metal or metal alloy, and is cast, machined, forged, stamped, additively manufactured, etc. The lock ring 212 includes a lock ring body 250, lock ring bores 254 and an inner lock ring bore 256.

Figure 11:
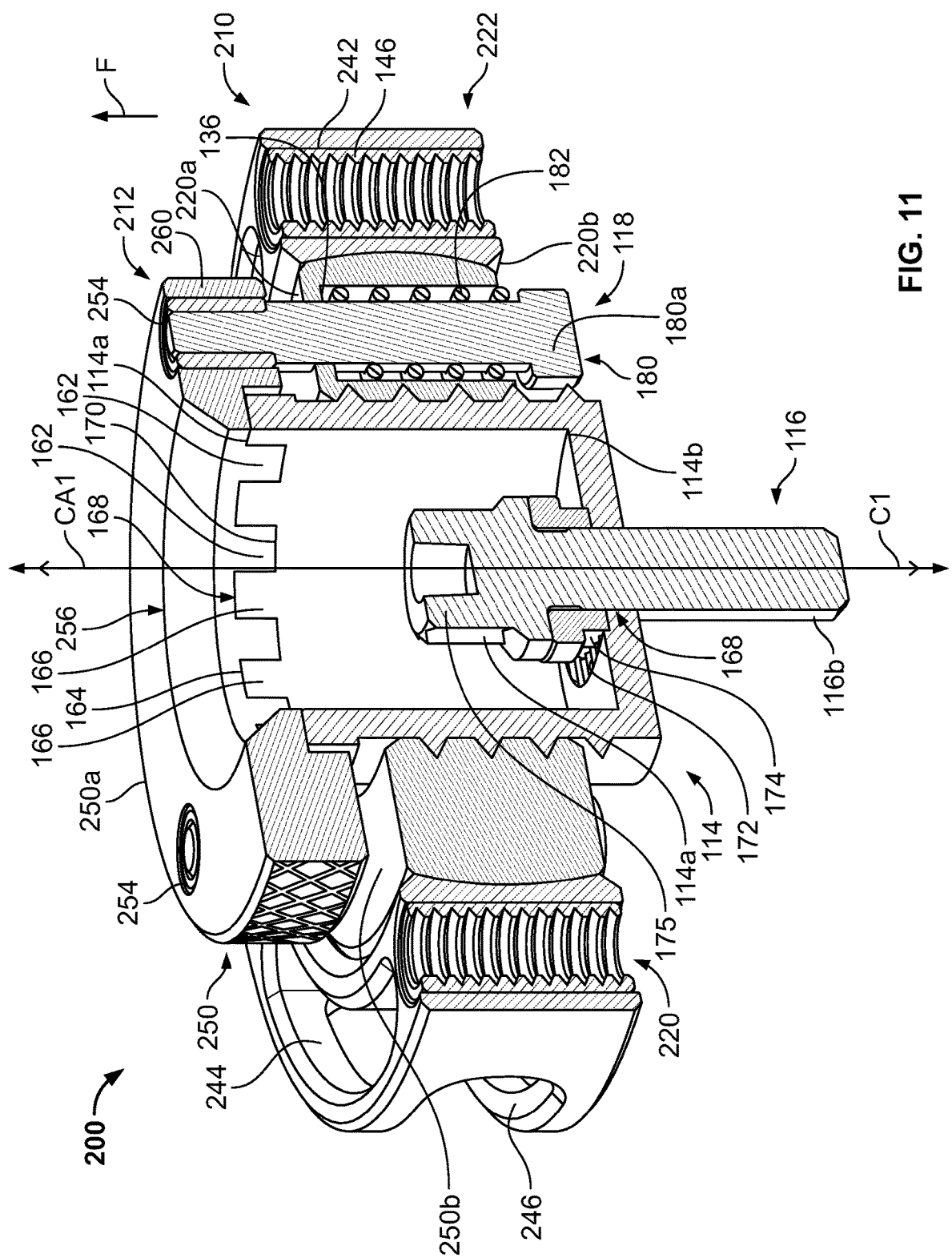
FIG. 11 is a cross-sectional view of the locking positioning system, taken along line 11-11 of FIG. 9, in which a lock ring associated with the locking positioning system is in a first position and the locking positioning system is in the first, locked state.

The lock ring body 250 is cylindrical, and extends from a first ring end 250a to an opposite second ring end 250b. The lock ring body 250 defines a graspable surface 258 about an outer perimeter or circumference of the lock ring 212 to enable a user to manipulate the lock ring 212. In one example, the graspable surface 258 is textured, and includes knurling, but the graspable surface 258 may be smooth, dimpled, etc. The lock ring bores 254 are defined through the lock ring body 250 from the first ring end 250a to the second ring end 250b (FIG. 11). In this example, the lock ring 212 includes three lock ring bores 254, however, the lock ring 212 may include any number of bores that comports with the number of lock assemblies 118. In this example, each of the lock ring bores 254 include a respective locking insert 260. The locking inserts 260 are internally threaded, and threadably engage with a plurality of threads defined on a mechanical fastener, such as the shoulder bolt 180 of a respective one of the lock assemblies 118 (FIG. 11). In certain examples, the locking inserts 260 may comprise the locking inserts 160, if desired. Each of the lock ring bores 254 is coaxially aligned with a respective one of the inner race attachment bores 230 to receive the shoulder bolt 180 of the respective one of the lock assemblies 118 (FIG. 11).

The inner lock ring bore 256 extends from the first ring end 250a to the second ring end 250b. In one example, the inner lock ring bore 256 is defined as a countersunk hole through the lock ring 212. With reference to FIG. 11, the inner lock ring bore 256 includes the plurality of lock teeth 162 defined about a perimeter or circumference of the inner lock ring bore 256 at the second ring end 250b. The tooth space 164 is defined between adjacent lock teeth 162, and the tooth space 164 receives the respective tooth of the plurality of housing teeth 166 of the housing 114 when the lock ring 212 is in the first position and the locking positioning system 200 is in the first, locked state. Each of the housing teeth 166 is spaced apart from the respective tooth space 164 and the lock teeth 162 when the lock ring 212 is in the second position and the locking positioning system 200 is in the second, unlocked state.

The housing 114 defines the housing teeth 166 at the first housing end 114a and defines the slot 168 at the second housing end 114b. The housing 114 includes the plurality of threads 134 that extend from the first housing end 114a to the second housing end 114b and cooperate with the threads 132 of the inner race 220 to enable the inner race 220 to move relative to the housing 114 in the second position of the lock ring 212. The housing teeth 166 extend axially from the first housing end 114a to engage with the lock ring 212, as discussed. The housing teeth 166 also define the stop 167 at the first housing end 114a to limit the further advancement of the inner race 120 relative to the housing 114. The housing tooth space 170 defined between adjacent housing teeth 166 receives the respective one of the lock teeth 162 when the lock ring 212 is in the first position and the locking positioning system 100 is in the first, locked state. Each of the lock teeth 162 is spaced apart from the respective housing tooth space 170 and the housing teeth 166 when the lock ring 212 is in the second position and the locking positioning system 100 is in the second, unlocked state. The slot 168 includes the slot serrations 172 that cooperate with the serrated washer 174 of the attachment bolt 116 to couple the attachment bolt 116 to the housing 114.

The attachment bolt 116 is coupled to the housing 114 via the serrated washer 174. The serrated washer 174 includes the washer serrations 176 that engage with the slot serrations 172 to maintain the position of the attachment bolt 116 relative to the housing 114. The head 116a of the attachment bolt 116 includes the tool coupling feature 175 for coupling the attachment bolt 116 to the tool. The shank 116b of the attachment bolt 116 is coupled to the first, fixed structure 102. In one example, the shank 116b includes threads and the attachment bore 102a is threaded to enable the attachment bolt 116 to be threadably coupled to the first, fixed structure 102 (FIG. 1).

With reference to FIG. 10, in this example, the locking positioning system 200 includes three lock assemblies 118. Each of the lock assemblies 118 includes the shoulder bolt 180 and the biasing member or spring 182. The head 180a provides the second seat 184 for the spring 182. The shank 180b includes the smooth portion 186 that extends from the head 180a to the threaded portion 188. The threaded portion 188 includes the plurality of threads to engage with the internal threads of a respective one of the locking inserts 260. Generally, with reference to FIG. 11, when the threaded portion 188 is engaged with and coupled to the locking inserts 260, the head 180a of the shoulder bolt 180 extends beyond the second side 220b of the inner race 220. By sizing the shank 180b such that the head 180a is external to the inner race 220, additional travel of the shoulder bolt 180 is provided to ensure that the lock teeth 162 disengage with the housing teeth 166 in the second position of the lock ring 212. The shoulder bolt 180 is inserted through a respective one of the inner race attachment bores 130 such that the spring 182 is received about the smooth portion 186 and retained within the respective inner race attachment bore 130 between the seat 136 and the second seat 184. The spring 182 is compressible by the head 180a of the shoulder bolt 180 to enable the lock ring 212 to be spaced apart from the housing 114 in the second position. Once a force is removed from the lock ring 212, the springs 182 expand, and engage the lock teeth 162 with the housing teeth 166 to return the lock ring 212 to the first position.

As the use and assembly of the locking positioning system 200 is similar or substantially the same as the use an assembly of the locking positioning system 100, discussed with regard to FIGS. 1-8, the use and assembly of the locking positioning system 200 will be discussed briefly herein. Briefly, the inner race 220 is coupled to the outer race 222 so as to be movable relative to the outer race 222. The threaded inserts 146 are coupled to the coupling bores 242 of the outer race 222. The threads 134 of the housing 114 are engaged with the threads 132 of the inner race 220. With the springs 182 positioned about the shoulder bolts 180, the shoulder bolts 180 are inserted into the inner race attachment bores 130. The locking inserts 260 are coupled to the lock ring 212. The shoulder bolts 180 are engaged with the locking inserts 260 and the lock teeth 162 are engaged with the housing teeth 166. With the lock teeth 162 engaged with the housing teeth 166, the lock ring 212 is in the first position and the locking positioning system 200 is in the first, locked state.

In the first, locked state, the locking positioning system 200 is coupled to the second, movable structure 104 (FIG. 1). Fasteners are inserted through the attachment holes 108 (FIG. 1) and into the threaded inserts 146 to couple the locking positioning system 200 to the second, movable structure 104 (FIG. 1). With the serrated washer 174 coupled about the head 116a of the attachment bolt 116, the attachment bolt 116 is inserted through the slot 168 and translated along the slot serrations 172 of the slot 168 until the second, movable structure 104 is located at a lateral position relative to the first, fixed structure 102 (FIG. 1). In the first position and first, locked state, the inner race 220 and the outer race 222 are held in a fixed position, and thus, the position of the second, movable structure 104 relative to the first, fixed structure 102 is fixed and inhibited from movement during operation of the vehicle, for example, during flight of the aircraft.

In order to adjust a rotational or angular position of the second, movable structure 104 relative to the first, fixed structure, the lock ring 212 is moved from the first position to the second position. In the second position and the second, unlocked state, the inner race 220 is movable relative to the housing 114 to adjust a position of the second, movable structure 104 relative to the first, fixed structure 102. In order to move the lock ring 212 to the second position, the force F (FIG. 11) is applied along the center axis C of the locking positioning system 200 to move the lock ring 212 relative to the housing 114. In one example, the force F is applied by a user gripping the lock ring 212 and pulling the lock ring 212 away from the housing 114. As the lock ring 212 moves along the center axis C1, the shoulder bolts 180 translate within the inner race attachment bores 230 and compress the springs 182. Once the lock ring 212 is moved such that the lock teeth 162 are spaced apart from the housing teeth 166, the inner race 220 is rotatable by the movement of the lock ring 212. In the second position, the lock ring 212 is manipulatable to move the second, movable structure 104 (FIG. 1) angularly relative to the first, fixed structure 102 (FIG. 1). The lock ring 212 is also rotatable in the second position, which enables the inner race 220 to be translated relative to the housing 114 along the center axis C1. The movement of the inner race 220 along the center axis C1 enables the second, movable structure 104 to be spaced closer to or further apart from the first, fixed structure 102 as the inner race 220 is coupled to the outer race 222 and the outer race 222 translates with the inner race 220. Once the adjustment of the second, movable structure 104 relative to the first, fixed structure 102 is complete, the lock ring 212 is released by the user, and the springs 182 expand, pulling the lock ring 212, and thus, the lock teeth 162 into engagement with the housing teeth 166. The springs 182 bias the lock ring 212 in the first position and bias the locking positioning system 200 in the first, locked state.

Thus, the locking positioning system 200 enables adjustment of the second, movable structure 104 in multiple degrees of freedom. In this regard, the attachment bolt 116 cooperates with the slot 168 of the housing 114 to enable adjustment of the second, movable structure along an X-axis. The threads 132 of the inner race 220 cooperates with the threads 134 of the housing 114 to enable adjustment of the second, movable structure along a Y-axis, which is parallel to the center axis C1. The angular rotation of the inner race 220 relative to the outer race 222 enables adjustment of the second, movable structure 104 in a yaw direction, rotating about the Y-axis. The rotation of the inner race 220 relative to the outer race 222 also enables adjustment of the second, movable structure 104 in a roll direction, rotating about the Z-axis. The rotation of the inner race 220 relative to the outer race 222 enables adjustment of the second, movable structure 104 in a pitch direction, rotating about the X-axis.

Figure 12:
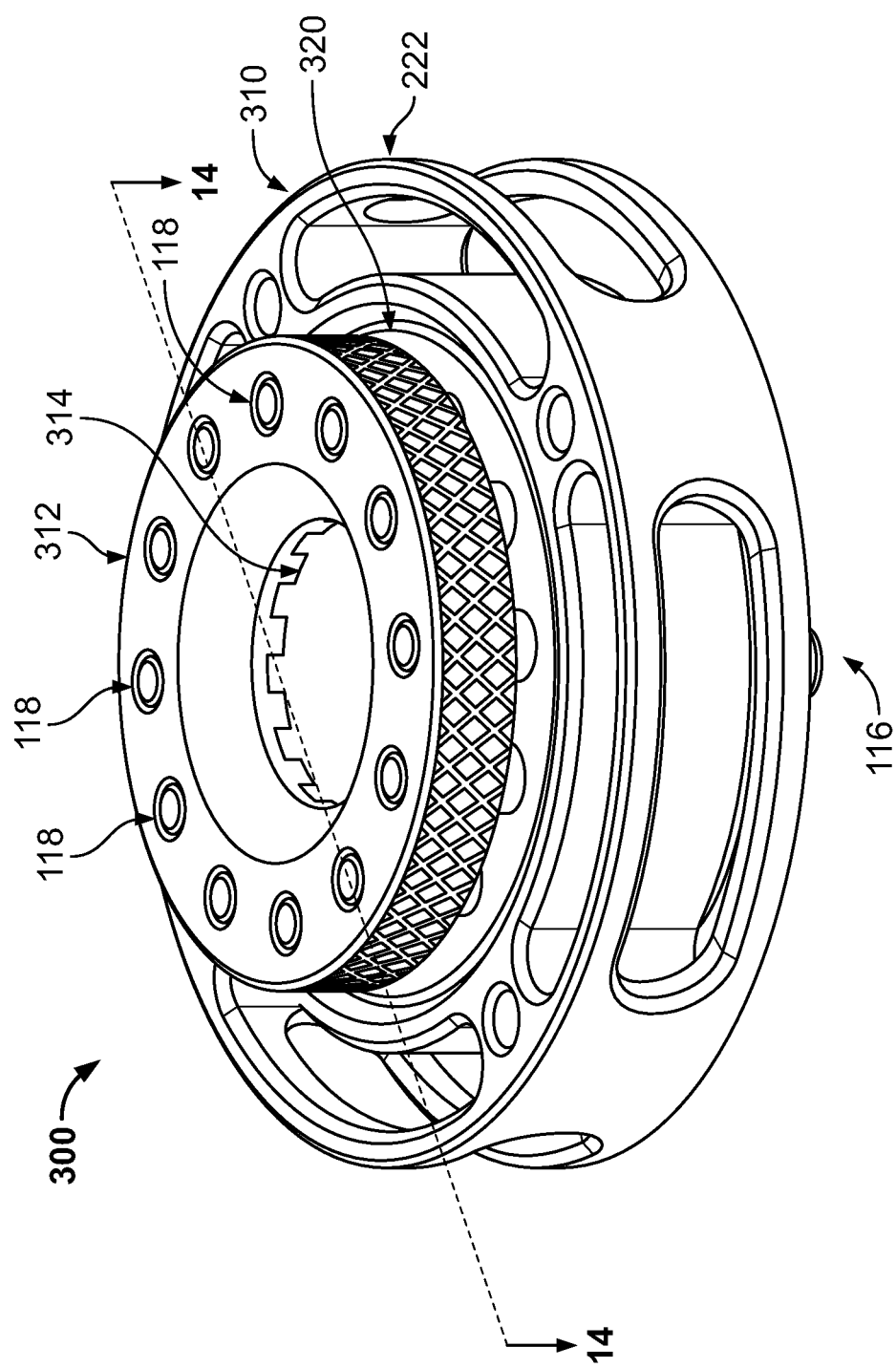
FIG. 12 is a top perspective view of another exemplary locking positioning system for coupling a movable structure, such as a component associated with a vehicle, to a fixed structure, such as the vehicle, in a first, locked state in accordance with the various teachings of the present disclosure.
Figure 13:
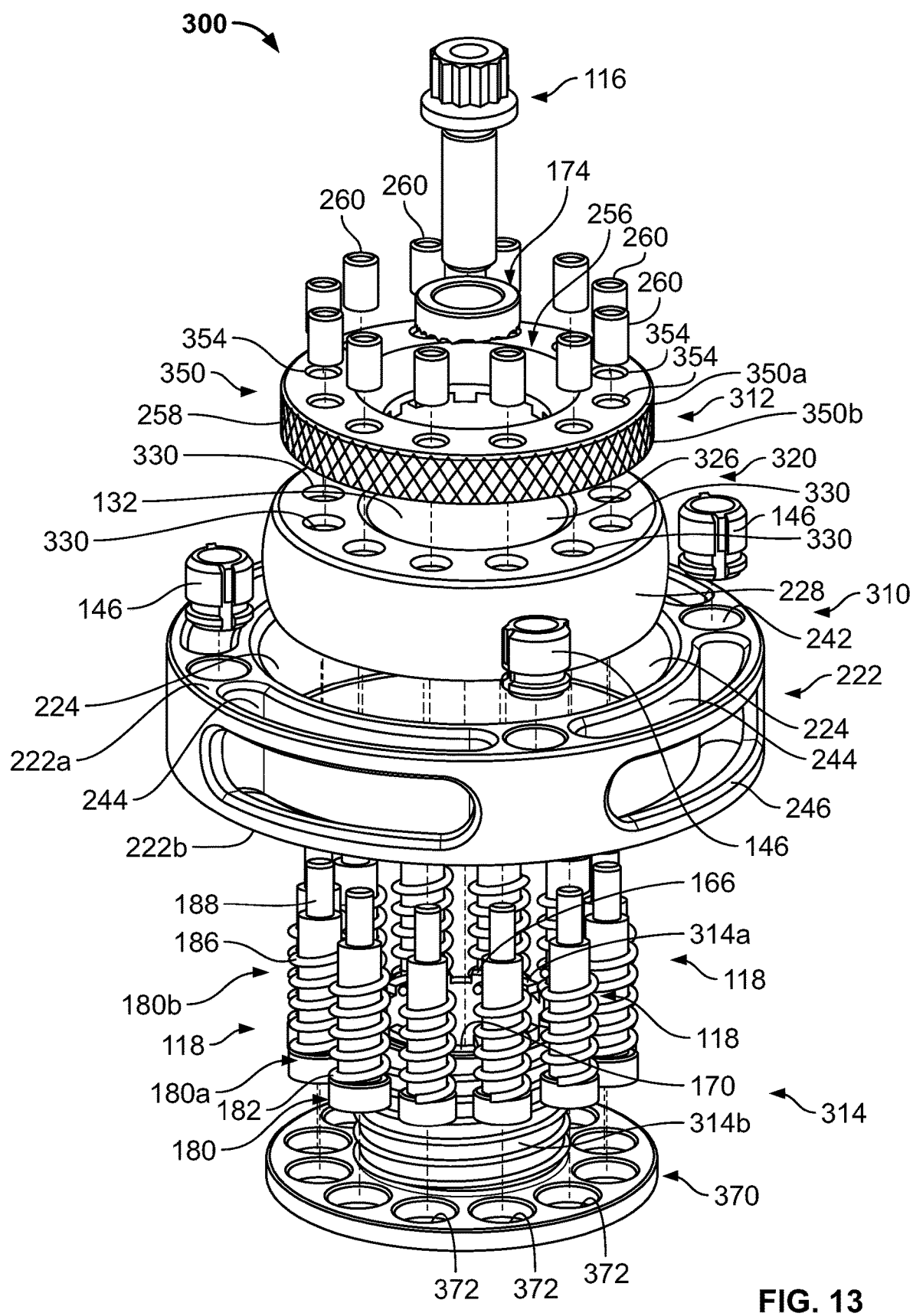
FIG. 13 is an exploded view of the locking positioning system of FIG. 12.

It should be noted that in other embodiments, the locking positioning system 100 may be configured differently to enable movement of the second, movable structure 104 relative to the first, fixed structure 102 in various degrees of freedom. For example, with reference to FIG. 12, a locking positioning system 300 is shown. As the locking positioning system 300 includes components that are the same or similar to components of the locking positioning system 100 discussed with regard to FIGS. 1-8 and the locking positioning system 200 discussed with regard to FIGS. 9-11, the same reference numerals will be used to denote the same or similar components. In this example, the locking positioning system 300 includes a bearing, such as a spherical bearing 310, a lock ring 312, a housing 314 (FIG. 13), the attachment bolt 116, and the plurality of lock assemblies 118 (FIG. 13). The locking positioning system 300 is movable between the first, locked state and the second, unlocked state to enable the second, movable structure 104 (FIG. 1) to be positioned in the desired orientation (rotation and translation) relative to the first, fixed structure 102 (FIG. 1).

With reference to FIG. 13, the spherical bearing 310 includes an inner race 320 and the outer race 222. The spherical bearing 310 is composed of metal or metal alloy, and is cast, machined, forged, stamped, additively manufactured, etc. The inner race 320 is coupled to the inner bore 224 of the outer race 222, and is movable relative to the outer race 222. Generally, the inner race 320 rotates angularly within the inner bore 224 of the outer race 222 relative to the central axis CA1 of the outer race 222 (FIG. 14), and also rotates about the central axis CAL The central axis CA1 of the outer race 222 is substantially parallel and colinear with a center axis C2 of the locking positioning system 300. The inner race 320 includes an inner race bore 326, an outer surface 228 and at least one or a plurality of inner race attachment bores 330. The inner race bore 326 is cylindrical and defines an inner perimeter or circumference of the inner race 320. The inner race bore 326 also defines the plurality of threads 132. The plurality of threads 132 cooperate with the plurality of threads 134 defined on the housing 314 to enable the housing 314 to move relative to the inner race 320. A rotation of the inner race 320 causes a translation of the inner race 320 along the housing 114, and thus, the outer race 222 coupled to the inner race 320. The outer surface 228 defines the outer perimeter or circumference of the inner race 320. The outer surface 228 is substantially smooth, and arcuate to enable the angular movement of the inner race 320 relative to the outer race 222.

In this example, the inner race 320 defines twelve inner race attachment bores 330. It should be noted that in other examples, the inner race 320 may be configured differently. Each of the inner race attachment bores 330 is cylindrical, and substantially smooth. In one example, with reference to FIG. 14, each of the inner race attachment bores 330 includes a reduced diameter proximate the first side 320a of the inner race 320. The first side 320a of the inner race 320 is opposite a second side 320b. The reduced diameter of each of the inner race attachment bores 330 defines the respective seat 136.

The outer race 222 surrounds the inner race 320. With reference back to FIG. 13, the outer race 222 includes the inner bore 224, the outer race surface 240, the plurality of coupling bores 242 and the plurality of outer race slots 244. The inner bore 224 receives the inner race 320 and cooperates with the outer surface 228 of the inner race 320 to enable the inner race 320 to move and articulate relative to the outer race 222. The outer race surface 240 is discontinuous, or is interrupted by the slots 246. The slots 246 are defined through the outer race surface 240 and are in communication with the outer race slots 244. Each of the coupling bores 242 includes the threaded insert 146, however, in other embodiments, the coupling bores 242 may include a plurality of internal threads. The threaded insert 146 includes the plurality of internal threads to receive the mechanical fastener, such as the bolt, to couple the outer race 222 to the second, movable structure 104 (FIG. 1). The outer race slots 244 alternate with the coupling bores 242 about the circumference of the outer race 222. The outer race slots 244 are in communication with the slots 246.

The lock ring 312 is coupled to the housing 314. The lock ring 312 is movable between a first position, in which the inner race 320 and the outer race 222 are held in a fixed position and the locking positioning system 300 is in first, locked state; and a second position, in which the inner race 320 is movable relative to the housing 314 to adjust a position of the second, movable structure 104 relative to the first, fixed structure 102 (FIG. 1) and the locking positioning system 300 is in the second, unlocked state. The lock ring 312 is composed of metal or metal alloy, and is cast, machined, forged, stamped, additively manufactured, etc. The lock ring 312 includes a lock ring body 350, lock ring bores 354 and the inner lock ring bore 256.

Figure 14:
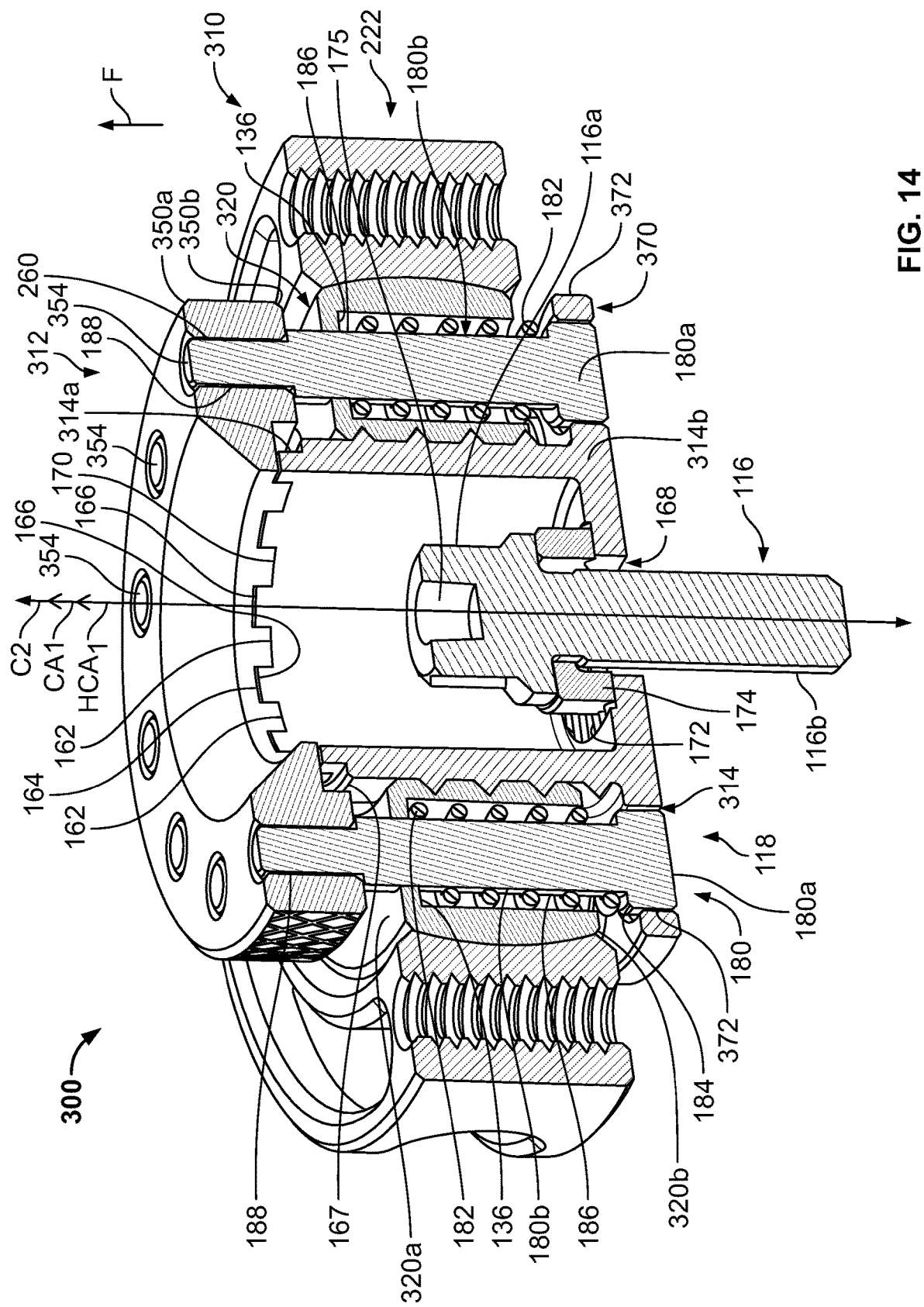
FIG. 14 is a cross-sectional view of the locking positioning system, taken along line 14-14 of FIG. 12, in which a lock ring associated with the locking positioning system is in a first position and the locking positioning system is in the first, locked state.

The lock ring body 350 is cylindrical, and extends from a first ring end 350a to an opposite second ring end 350b. The lock ring body 350 defines the graspable surface 258 about an outer perimeter or circumference of the lock ring 312 to enable a user to manipulate the lock ring 312. The lock ring bores 354 are defined through the lock ring body 350 from the first ring end 350a to the second ring end 350b (FIG. 14). In this example, the lock ring 312 includes twelve lock ring bores 354, however, the lock ring 312 may include any number of bores that comports with the number of lock assemblies 118. In this example, each of the lock ring bores 354 include a respective locking insert 260. The locking inserts 260 are internally threaded, and threadably engage with a plurality of threads defined on a mechanical fastener, such as the shoulder bolt 180 of a respective one of the lock assemblies 118 (FIG. 14).

The inner lock ring bore 256 extends from the first ring end 350a to the second ring end 350b. The inner lock ring bore 256 is defined as a countersunk hole through the lock ring 312. With reference to FIG. 14, the inner lock ring bore 256 includes the plurality of lock teeth 162 defined about a perimeter or circumference of the inner lock ring bore 256 at the second ring end 350b. The tooth space 164 is defined between adjacent lock teeth 162, and the tooth space 164 receives the respective tooth of the plurality of housing teeth 166 of the housing 314 when the lock ring 312 is in the first position and the locking positioning system 300 is in the first, locked state. Each of the housing teeth 166 is spaced apart from the respective tooth space 164 and the lock teeth 162 when the lock ring 312 is in the second position and the locking positioning system 300 is in the second, unlocked state.

The housing 314 defines the housing teeth 166 at a first housing end 314a and defines the slot 168 and an attachment flange 370 at a second housing end 314b, with the second housing end 314b opposite the first housing end 314a. The housing 314 is composed of metal or metal alloy, and is cast, machined, forged, stamped, additively manufactured, etc. With reference to FIG. 13, the housing 314 is cylindrical, with an open perimeter at the first housing end 314a and a closed perimeter at the second housing end 314b. The housing 314 includes the plurality of threads 134 that extend from the first housing end 314a to the second housing end 314b and cooperate with the threads 132 of the inner race 320 to enable the inner race 320 to move relative to the housing 314 in the second position of the lock ring 312. The housing teeth 166 extend axially from the first housing end 314a to engage with the lock ring 312. The housing teeth 166 also define the stop 167 at the first housing end 114a to limit the further advancement of the inner race 320 relative to the housing 114. The housing tooth space 170 defined between adjacent housing teeth 166 receives a respective one of the lock teeth 162 when the lock ring 312 is in the first position and the locking positioning system 300 is in the first, locked state (FIG. 14). Each of the lock teeth 162 is spaced apart from the respective housing tooth space 170 and the housing teeth 166 when the lock ring 312 is in the second position and the locking positioning system 300 is in the second, unlocked state.

An interior surface of the housing 314 is substantially smooth. At the second housing end 314b, the slot 168 is defined to enable the attachment bolt 116 to pass through the housing 314 and into the first, fixed structure 102 (FIG. 1). In this example, the slot 168 is elongated, and is defined along an axis that is substantially parallel to a housing central axis HCA1. The housing central axis HCA1 is substantially parallel and colinear with the central axis CA1 of the outer race 222 and the center axis C2 of the locking positioning system 300. The slot 168 includes the plurality of slot serrations 172 defined about a perimeter of the slot 168 that cooperate with the serrated washer 174 to couple the attachment bolt 116 to the housing 314.

Figure 15:
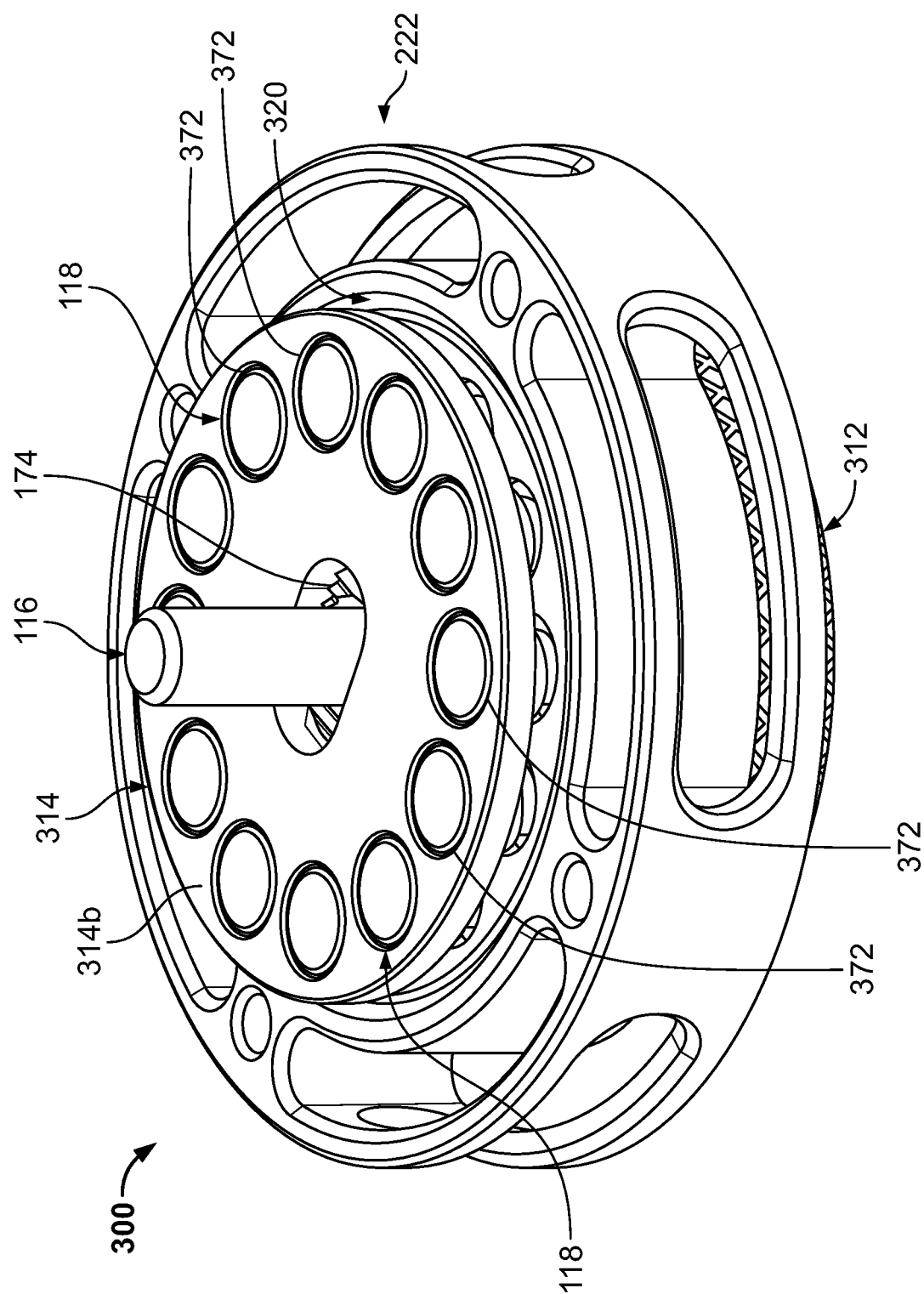
FIG. 15 is a bottom perspective view of the locking positioning system of FIG. 12 in the first, locked state.

With reference to FIG. 13, the attachment flange 370 of the housing 314 extends radially outward from the housing 314 at the second housing end 314b. The attachment flange 370 is annular, and defines a plurality of housing bores 372. In this example, with reference to FIG. 15, the attachment flange 370 defines twelve housing bores 372, one for each one of the shoulder bolts 180 associated with the lock assemblies 118. Each of the housing bores 372 is coaxially aligned with a respective one of the inner race attachment bores 330 and lock ring bores 354 to receive the shoulder bolt 180 of the respective one of the lock assemblies 118 (FIG. 13). Generally, once the locking positioning system 300 is assembled, each of the housing bores 372 surround the head 180a of the respective shoulder bolt 180 to guide a movement of the shoulder bolt 180 relative to the housing 314 during movement of the locking positioning system 300 between the first, locked state and the second, unlocked state.

With reference back to FIG. 14, the attachment bolt 116 is coupled to the housing 114 via the serrated washer 174. The serrated washer 174 includes the washer serrations 176 that engage with the slot serrations 172 to maintain the position of the attachment bolt 116 relative to the housing 314. The head 116a of the attachment bolt 116 includes the tool coupling feature 175 for coupling the attachment bolt 116 to the tool. The shank 116b of the attachment bolt 116 is coupled to the first, fixed structure 102. In one example, the shank 116b includes threads and the attachment bore 102a is threaded to enable the attachment bolt 116 to be threadably coupled to the first, fixed structure 102 (FIG. 1).

With reference to FIG. 13, in this example, the locking positioning system 300 includes twelve lock assemblies 118. Each of the lock assemblies 118 includes the shoulder bolt 180 and the biasing member or spring 182. The head 180a provides the second seat 184 for the spring 182. The shank 180b includes the smooth portion 186 that extends from the head 180a to the threaded portion 188. The threaded portion 188 includes the plurality of threads to engage with the internal threads of a respective one of the locking inserts 260. Generally, with reference to FIG. 14, when the threaded portion 188 is engaged with and coupled to the locking inserts 260, the head 180a of the shoulder bolt 180 extends beyond the second side 320b of the inner race 320 and is surrounded by the respective housing bore 372. By sizing the shank 180b such that the head 180a is external to the inner race 320, additional travel of the shoulder bolt 180 is provided to ensure that the lock teeth 162 disengage with the housing teeth 166 in the second position of the lock ring 312. The shoulder bolt 180 is inserted through a respective one of the inner race attachment bores 330 such that the spring 182 is received about the smooth portion 186 and retained within the respective inner race attachment bore 130 between the seat 136 and the second seat 184. The spring 182 is compressible by the head 180a of the shoulder bolt 180 to enable the lock ring 312 to be spaced apart from the housing 314 in the second position. Once a force is removed from the lock ring 312, the springs 182 expand, and engage the lock teeth 162 with the housing teeth 166 to return the lock ring 312 to the first position.

As the use and assembly of the locking positioning system 300 is similar or substantially the same as the use an assembly of the locking positioning system 100 and 200, discussed with regard to FIGS. 1-11, the use and assembly of the locking positioning system 300 will be discussed briefly herein. Briefly, the inner race 320 is coupled to the outer race 222 so as to be movable relative to the outer race 222. The threaded inserts 146 are coupled to the coupling bores 242 of the outer race 222. The threads 134 of the housing 314 are engaged with the threads 132 of the inner race 320. With the springs 182 positioned about the shoulder bolts 180, the shoulder bolts 180 are inserted through the respective housing bores 372 and into the inner race attachment bores 330. The locking inserts 260 are coupled to the lock ring 312. The shoulder bolts 180 are engaged with the locking inserts 260 and the lock teeth 162 are engaged with the housing teeth 166. With the lock teeth 162 engaged with the housing teeth 166, the lock ring 312 is in the first position and the locking positioning system 300 is in the first, locked state.

In the first, locked state, the locking positioning system 300 is coupled to the second, movable structure 104 (FIG. 1). Fasteners are inserted through the attachment holes 108 (FIG. 1) and into the threaded inserts 146 to couple the locking positioning system 300 to the second, movable structure 104 (FIG. 1). With the serrated washer 174 coupled about the head 116a of the attachment bolt 116, the attachment bolt 116 is inserted through the slot 168 and translated along the slot serrations 172 of the slot 168 until the second, movable structure 104 is located at a lateral position relative to the first, fixed structure 102 (FIG. 1). In the first position and first, locked state, the inner race 320 and the outer race 222 are each held in a fixed position, and thus, the position of the second, movable structure 104 relative to the first, fixed structure 102 (FIG. 1) is fixed and inhibited from movement during operation of the vehicle, such as, during flight of the aircraft.

In order to adjust a rotational or angular position of the second, movable structure 104 relative to the first, fixed structure, the lock ring 312 is moved from the first position to the second position. In the second position and the second, unlocked state, the inner race 320 is movable relative to the housing 314 to adjust a position of the second, movable structure 104 relative to the first, fixed structure 102 (FIG. 1). In order to move the lock ring 312 to the second position, with reference to FIG. 14, the force F is applied along the center axis C2 of the locking positioning system 300 to move the lock ring 312 relative to the housing 314. In one example, the force F is applied by a user gripping the lock ring 312 and pulling the lock ring 312 away from the housing 314. As the lock ring 312 moves along the center axis C2, the shoulder bolts 180 translate within the inner race attachment bores 230 and compress the springs 182. Once the lock ring 312 is moved such that the lock teeth 162 are spaced apart from the housing teeth 166, the inner race 320 is rotatable by the movement of the lock ring 312. In the second position, the lock ring 312 is manipulatable to move the second, movable structure 104 (FIG. 1) angularly relative to the first, fixed structure 102 (FIG. 1). The lock ring 312 is also rotatable in the second position, which enables the inner race 320 to be translated relative to the housing 114 along the center axis C2. The movement of the inner race 320 along the center axis C2 enables the second, movable structure 104 to be spaced closer to or further apart from the first, fixed structure 102 as the inner race 320 is coupled to the outer race 322 and the outer race 322 translates with the inner race 320. Once the adjustment of the second, movable structure 104 relative to the first, fixed structure 102 is complete, the lock ring 312 is released by the user, and the springs 182 expand, pulling the lock ring 312, and thus, the lock teeth 162 into engagement with the housing teeth 166. The springs 182 bias the lock ring 312 in the first position and bias the locking positioning system 300 in the first, locked state.

Thus, the locking positioning system 300 enables adjustment of the second, movable structure 104 in multiple degrees of freedom. In this regard, the attachment bolt 116 cooperates with the slot 168 of the housing 314 to enable adjustment of the second, movable structure along an X-axis. The threads 132 of the inner race 320 cooperates with the threads 134 of the housing 314 to enable adjustment of the second, movable structure along a Y-axis, which is parallel to the center axis C. The angular rotation of the inner race 320 relative to the outer race 222 enables adjustment of the second, movable structure 104 in a yaw direction, rotating about the Y-axis. The rotation of the inner race 320 relative to the outer race 222 also enables adjustment of the second, movable structure 104 in a roll direction, rotating about the Z-axis. The rotation of the inner race 320 relative to the outer race 222 enables adjustment of the second, movable structure 104 in a pitch direction, rotating about the X-axis. In addition, the use of the twelve lock assemblies 118 ensure the locking positioning system 300 remains in the first, locked state when experiencing high torque. In this regard, in the first position, the lock teeth 162 and the housing teeth 166 are engaged while the heads 180a of the shoulder bolts 180 are also engaged in the housing bores 372 of the attachment flange 370. This may be beneficial for an application in which an extremely high torque is expected on the outer race 222.

Thus, the locking positioning system 100, 200, 300 couples the first, fixed structure 102 (FIG. 1) to the second, movable structure 104, but enables the second, movable structure 104 to be adjusted relative to the first, fixed structure 102 in various degrees of freedom. By enabling the adjustment of the second, movable structure 104 (FIG. 1) in various degrees of freedom, misalignment between the first, fixed structure 102 and the second, movable structure 104 can be reduced or eliminated, which in the example of an aircraft, may reduce drag. In addition, by enabling the adjustment through the movement of the lock ring 112, 212, 312, a user can adjust the second, movable structure 104 by hand and without the use of special tools. This enables adjustments to be made easily, and at various locations. Generally, the locking positioning system 100, 200, 300 enables adjustments between the second, movable structure 104 and the first, fixed structure 102 when tool access or visual access is difficult, limited, or substantially impossible.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A locking positioning system, comprising:
a bearing including an inner race and an outer race, the outer race coupled to the inner race, the outer race to be coupled to a second structure;
a housing movably coupled to the inner race, the housing to be coupled to a first structure;
a lock ring coupled to the housing, the lock ring movable between a first position, in which the inner race is held in a fixed position, and a second position, in which the inner race is movable to adjust a position of the second structure relative to the first structure; and
a mechanical fastener that couples the lock ring to the inner race,
wherein the inner race defines an inner race attachment bore and the lock ring defines a lock ring bore coaxially aligned with the inner race attachment bore, and the mechanical fastener is received within the inner race attachment bore and the lock ring bore to couple the lock ring to the inner race.

2. The locking positioning system of Claim 1, wherein the lock ring bore is defined as a counterbore through a surface of the lock ring.

3. The locking positioning system of Claim 1, further comprising a spring disposed between a head of the mechanical fastener and a seat defined within the inner race attachment bore, and the spring biases the lock ring in the first position.

4. The locking positioning system of Claim 1, wherein the housing further comprises a flange that includes a plurality of bores, with a head of the mechanical fastener received within one of the plurality of bores in the first position.

5. The locking positioning system of claim 1, wherein the housing defines a plurality of housing teeth, and the lock ring defines a plurality of lock teeth that engage the plurality of housing teeth in the first position.

6. The locking positioning system of claim 5, wherein the housing has a first housing end opposite a second housing end, with the plurality of housing teeth defined at the first housing end and a serrated slot defined at the second housing end, the serrated slot configured to receive a second mechanical fastener to couple the housing to the first structure.

7. The locking positioning system of claim 6, wherein the second mechanical fastener includes a serrated washer, which engages with the serrated slot.

8. The locking positioning system of claim 5, wherein the plurality of housing teeth are defined about a circumference of the housing and the plurality of lock teeth are defined about an inner circumference of the lock ring.

9. The locking positioning system of claim 1, wherein the outer race defines at least one coupling bore to couple the outer race to the second structure.

10. The locking positioning system of claim 9, wherein the outer race includes at least one threaded insert to receive a mechanical fastener to couple the outer race to the second structure.

11. The locking positioning system of claim 1, wherein the lock ring includes a graspable surface defined about an outer perimeter of the lock ring.

12. The locking positioning system of claim 1, wherein the first structure is a component of a vehicle, and the second structure is a component of an engine of the vehicle.

13. The locking positioning system of claim 1, wherein the bearing is a spherical bearing.

14. A locking positioning system, comprising:
a spherical bearing including an inner race and an outer race, the outer race coupled to the inner race, the outer race to be coupled to a second structure;
a housing movably coupled to the inner race, the housing to be coupled to a first structure and the housing defines a plurality of housing teeth about a circumference of the housing; and
a lock ring coupled to the housing and the inner race, the lock ring defining a plurality of lock teeth about an inner circumference of the lock ring that engage the plurality of housing teeth in a first position, the lock ring movable between the first position, in which the inner race is held in a fixed position, and a second position, in which the inner race is movable to adjust a position of the second structure relative to the first structure.

15. The locking positioning system of claim 14, wherein the inner race defines an inner race attachment bore and the lock ring defines a lock ring bore coaxially aligned with the inner race attachment bore, and a mechanical fastener is received within the inner race attachment bore and the lock ring bore to couple the lock ring to the inner race.

16. The locking positioning system of claim 15, further comprising a spring disposed between a head of the mechanical fastener and a seat defined within the inner race attachment bore, and the spring biases the lock ring in the first position.

17. The locking positioning system of claim 14, wherein the housing has a first housing end opposite a second housing end, with the plurality of housing teeth defined at the first housing end and a serrated slot defined at the second housing end, the serrated slot configured to receive a second mechanical fastener to couple the housing to the first structure.

18. The locking positioning system of claim 14, wherein the outer race defines at least one coupling bore to couple the outer race to the second structure.

* * * * *